(12) United States Patent
Han et al.

(10) Patent No.: US 11,736,812 B2
(45) Date of Patent: Aug. 22, 2023

(54) IMAGE SENSING DEVICE FOR CORRECTING IMAGE USING BLOCK AREAS AND METHOD OF OPERATING THE SAME

(71) Applicant: SK hynix Inc., Gyeonggi-do (KR)

(72) Inventors: Ji Hee Han, Gyeonggi-do (KR); Jeong Yong Song, Gyeonggi-do (KR); Jae Yoon Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 30 days.

(21) Appl. No.: 17/521,506

(22) Filed: Nov. 8, 2021

(65) Prior Publication Data

US 2022/0360722 A1 Nov. 10, 2022

(30) Foreign Application Priority Data

May 7, 2021 (KR) .......................... 10-2021-0059457

(51) Int. Cl.
*H04N 23/76* (2023.01)
*G06T 7/80* (2017.01)
*H04N 9/77* (2006.01)
*H04N 23/71* (2023.01)

(52) U.S. Cl.
CPC ............... *H04N 23/76* (2023.01); *G06T 7/80* (2017.01); *H04N 9/77* (2013.01); *H04N 23/71* (2023.01); *G06T 2207/10024* (2013.01); *G06T 2207/20021* (2013.01)

(58) Field of Classification Search
CPC .......... H04N 23/76; H04N 9/77; H04N 23/71; H04N 23/60; H04N 25/134; H04N 25/61; H04N 25/671; H04N 17/002; H04N 25/60; H04N 23/84; H04N 25/745; H04N 25/771; G06T 7/80; G06T 2207/10024; G06T 2207/20021; G06T 5/009
USPC ...................................... 348/222.1
See application file for complete search history.

(56) References Cited

U.S. PATENT DOCUMENTS

| | | | |
|---|---|---|---|
| 7,920,205 B2 * | 4/2011 | Awazu | G03B 15/05 396/164 |
| 9,927,539 B2 | 3/2018 | Shahar et al. | |
| 2006/0262187 A1 * | 11/2006 | Takizawa | G06V 40/172 348/77 |
| 2007/0223908 A1 * | 9/2007 | Sakamoto | H04N 23/71 396/234 |

(Continued)

FOREIGN PATENT DOCUMENTS

KR 10-2016-0061612 A 6/2016

*Primary Examiner* — Usman A Khan
(74) *Attorney, Agent, or Firm* — IP & T Group LLP

(57) ABSTRACT

Provided herein may be an image sensing device and a method of operating the same. The image sensing device may include an image sensor configured to acquire an image including a plurality of pixel values, a memory configured to store reference gain values of each of a plurality of block areas included in the image, and an image processor configured to calculate gain values included in each of the plurality of block areas using the reference gain values and to output a correction image in which the reference gain values and the gain values are applied to the plurality of pixel values, wherein the block areas include a first block area and a second block area having a shorter distance from a center of the image than the first block area and having a size greater than that of the first block area.

18 Claims, 18 Drawing Sheets

(56) References Cited

U.S. PATENT DOCUMENTS

| | | | |
|---|---|---|---|
| 2008/0159628 A1* | 7/2008 | Yoshida | H04N 23/64 348/E5.042 |
| 2008/0170132 A1* | 7/2008 | Yi | H04N 23/675 348/222.1 |
| 2008/0187235 A1* | 8/2008 | Wakazono | H04N 23/76 348/E5.091 |
| 2009/0102940 A1* | 4/2009 | Uchida | H04N 23/634 348/222.1 |
| 2009/0102942 A1* | 4/2009 | Yoshizumi | H04N 23/695 348/222.1 |
| 2009/0103778 A1* | 4/2009 | Yoshizumi | H04N 23/611 382/103 |
| 2009/0115868 A1* | 5/2009 | Kim | H04N 23/611 348/222.1 |
| 2011/0298886 A1* | 12/2011 | Price | H04N 23/71 348/E5.037 |
| 2013/0016249 A1* | 1/2013 | Mine | H04N 9/643 348/E9.051 |
| 2014/0085505 A1* | 3/2014 | Asuka | H04N 25/63 348/229.1 |

* cited by examiner

FIG. 8A $$(1\text{-}1)\ \text{ref\_Gain\_xy} = \frac{\text{ROI\_AvgPV\_G}}{\text{ref\_PV\_xy}}$$

$$(1\text{-}2)\ \text{ref\_Gain\_xy} = \frac{\text{ROI\_AvgPV\_Gb}}{\text{ref\_PV\_xy}}$$

$$(1\text{-}3)\ \text{ref\_Gain\_xy} = \frac{\text{ROI\_AvgPV\_Gr}}{\text{ref\_PV\_xy}}$$

$$(2)\ \text{ref\_Gain\_xy} = \frac{\text{ROI\_AvgPV\_R}}{\text{ref\_PV\_xy}}$$

$$(3)\ \text{ref\_Gain\_xy} = \frac{\text{ROI\_AvgPV\_B}}{\text{ref\_PV\_xy}}$$

$$\text{Gain\_P\_xy} = \frac{1}{W*H} \begin{bmatrix} x1 & x2 \end{bmatrix} \begin{bmatrix} \text{ref\_PX1} & \text{ref\_PX3} \\ \text{ref\_PX2} & \text{ref\_PX4} \end{bmatrix} \begin{bmatrix} y1 \\ y2 \end{bmatrix}$$

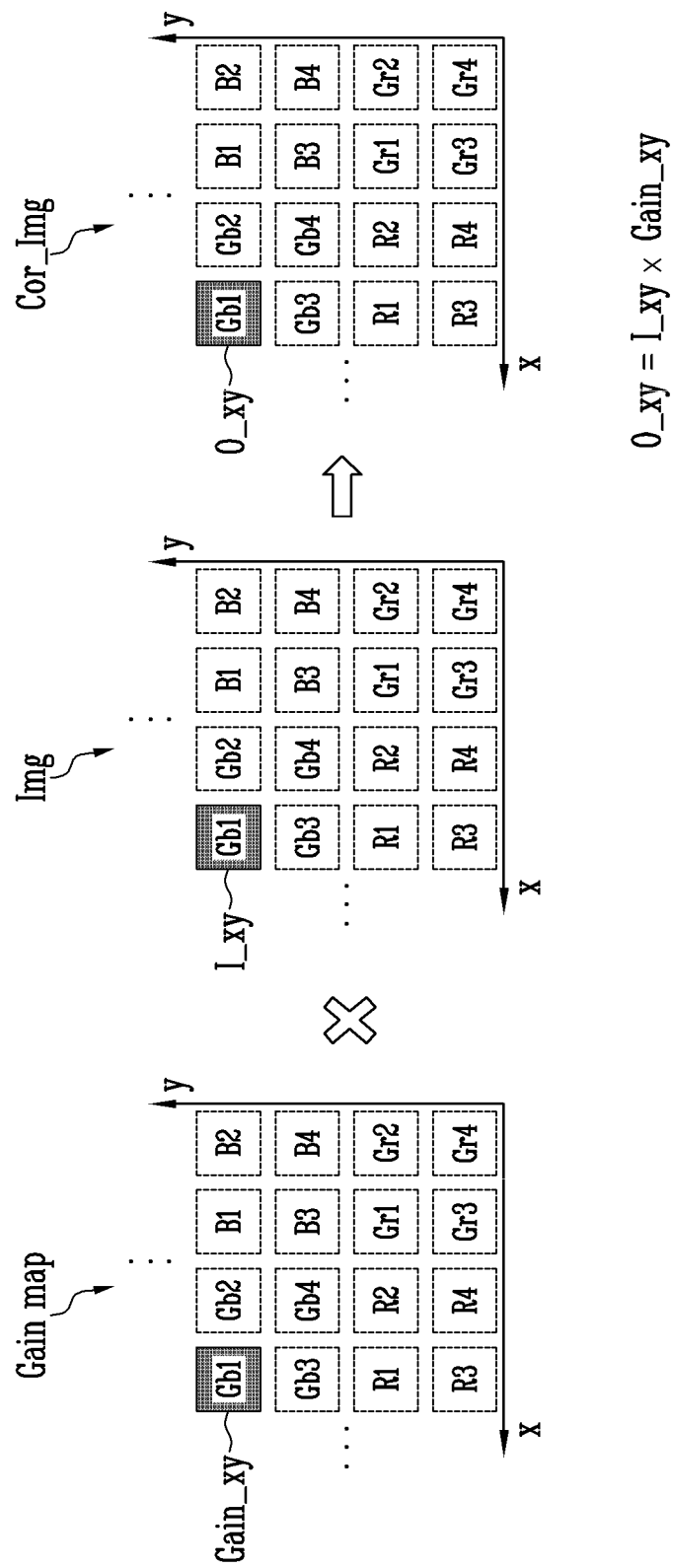

IMAGE SENSING DEVICE FOR CORRECTING IMAGE USING BLOCK AREAS AND METHOD OF OPERATING THE SAME

CROSS-REFERENCE TO RELATED APPLICATION

The present application claims priority under 35 U.S.C. § 119(a) to Korean patent application number 10-2021-0059457 filed on May 7, 2021, the entire disclosure of which is incorporated by reference herein.

BACKGROUND

Field of Invention

Various embodiments of the present disclosure generally relate to an electronic device, and more particularly to an image sensing device and a method of operating the image sensing device.

Description of Related Art

An image-sensing (image sensing) device is a device which acquires an image. Recently, with the development of the computer industry and the communication industry, demand has increased for image sensing devices in various electronic devices such as a smartphone, a digital camera, a gaming console, an Internet of Things (IoT) device, a robot, a security camera, a medical camera, and an autonomous vehicle.

The image sensing device may correct an image to improve image quality. The reason for this is that the quality of an image may be degraded due to the pixel structure of the image sensing device, wavelength characteristics of light, fabrication error in a lens, alignment error between the lens and an image sensor, or the like. In particular, when an imbalance between green channels (e.g., a channel Gb and a channel Gr), which correspond to one of the colors most sensitive to human vision is increased, a factor that degrades image quality, such as grid noise, may occur in an image.

The image sensing device may allow data that is to be used for correction to be previously stored in a memory. However, an optimization task is required for minimizing the resources required for data processing and storage while maintaining performance, such as improvement of image quality, in that resources such as hardware resources are limited.

SUMMARY

Various embodiments of the present disclosure are directed to an image sensing device and a method of operating the image sensing device, which may reduce the computational load and the amount of data to be used for image correction.

An embodiment of the present disclosure may provide for an image sensing device. The image sensing device may include an image sensor configured to acquire an image including a plurality of pixel values, a memory configured to store reference gain values of each of a plurality of block areas included in the image, and an image processor configured to calculate gain values included in each of the plurality of block areas using the reference gain values and to output a correction image in which the reference gain values and the gain values are applied to the plurality of pixel values, wherein the plurality of block areas include a first block area and a second block area having a shorter distance from a center of the image than the first block area and having a size greater than that of the first block area.

An embodiment of the present disclosure may provide for a method of operating an image sensing device. The method may include, calculating reference gain values of each of a plurality of block areas included in a calibration image acquired through the image sensing device, calculating gain values included in each of the plurality of block areas using the reference gain values, storing the reference gain values and the gain values in a memory, and when an image is acquired through the image sensing device, outputting a correction image in which the reference gain values and the gain values that are stored in the memory are applied to the plurality of pixel values, wherein the plurality of block areas include a first block area and a second block area having a shorter distance from a center of the calibration image than the first block area and having a size greater than that of the first block area.

BRIEF DESCRIPTION OF THE DRAWINGS

FIGS. 8A to 8D are diagrams illustrating a method of calculating reference gain values according to an embodiment of the present disclosure.

FIG. 10 is a diagram illustrating a correction image according to an embodiment of the present disclosure.

DETAILED DESCRIPTION

Specific structural or functional descriptions in the embodiments of the present disclosure introduced in this specification describe embodiments according to the concept of the present disclosure. The embodiments according to the concept of the present disclosure may be practiced in various forms, and should not be construed as being limited to the embodiments described in the specification.

Figure 1:
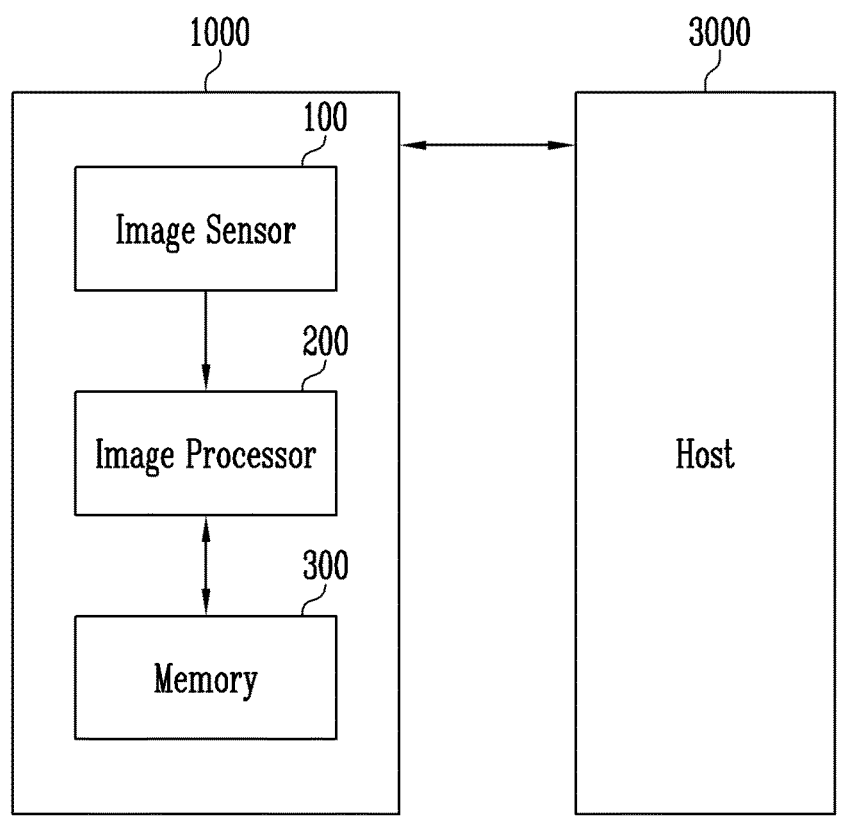
FIG. 1 is a diagram illustrating an image sensing device according to an embodiment of the present disclosure.

FIG. 1 is a diagram illustrating an image sensing device 1000 according to an embodiment of the present disclosure.

Referring to FIG. 1, the image sensing device 1000 may be operated under the control of a host 3000.

The image sensing device 1000 may acquire an image in response to a request from the host 3000. Further, the image sensing device 1000 may output the image to the host 3000 or a device indicated by the host 3000 in response to the request from the host 3000. Here, the device indicated by the host 3000 may be a memory device which stores data or a display device which outputs data using a visual method.

The image sensing device 1000 may be implemented in the form of a packaged module, a part or the like. In this case, the image sensing device 1000 may be installed in the host 3000. Alternatively, the image sensing device 1000 may be implemented as an electronic device separate from the host 3000.

The host 3000 may be implemented using any of various electronic devices. For example, the host 3000 may be implemented as a digital camera, a mobile device, a smartphone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, or the like.

The image sensing device 1000 may include an image sensor 100, an image processor 200, and a memory 300.

The image sensor 100 may acquire an image Img. In detail, the image sensor 100 may acquire an image when a command for controlling acquisition of an image is received from the host 3000. The image may include a plurality of pixel data pieces (or a plurality of pixel data). Independent pieces of pixel data may be mapped to respective pixels. That is, the image sensor 100 may acquire an image including a plurality of pixel data pieces by acquiring the pieces of pixel data corresponding to respective pixels. The pixel data (or the pixel data piece) may include information indicating at least one of a location, a color channel, a pixel value, and an exposure value.

The location of a pixel may indicate the location at which the corresponding pixel, among the plurality of pixels, is arranged.

The color channel of a pixel may indicate the color of light for the corresponding pixel. For example, the color channel may include one of a red channel, a green channel, and a blue channel. The green channel may include a first green channel and a second green channel, which are classified depending on the location of the pixel. For example, a pixel with the first green channel may be a pixel in the same row as the pixel with the blue channel and the pixel with the second green channel may be a pixel in the same row as the pixel with the red channel. In other examples, the pixel with the first green channel may be a pixel in the same column as the pixel with the blue channel and the pixel with the second green channel may be a pixel in the same column as the pixel with the red channel.

The pixel value may indicate the brightness of light for the corresponding pixel. In an example, it can be seen that, as the pixel value is greater, the light is brighter. The exposure value of a pixel may indicate the time during which light is sensed for the corresponding pixel.

For this, the image sensor 100 may be implemented as a charge-coupled device (CCD) sensor or a complementary metal oxide semiconductor (CMOS) sensor.

The image processor 200 may correct the image. In detail, when an image is acquired through the image sensor 100, the image processor 200 may generate a correction image Cor_Img in which a gain map is applied to the image. For example, the image processor 200 may generate a correction image in which gain values included in the gain map are applied to pixels. Also, the image processor 200 may output the correction image. For example, the image processor 200 may output the correction image to the host 3000 or the device indicated by the host 3000.

For this operation, the image sensor 100 may acquire a calibration image Cal_Img. The calibration image is an image for extracting the gain map that is used to correct the image acquired from the image sensor 100. For example, the calibration image may be an image acquired by the image sensor 100 to capture a white background in an environment having uniform illuminance. Due to the structure of the image sensor 100 or the wavelength characteristics of light, distortion, such as non-uniformity in a pixel value for each pixel location or each color channel, may occur in the image acquired through the image sensor 100. Because different types of distortion may occur in respective image sensors 100, separate gain maps may be required for respective image sensors 100. The calibration image may include a plurality of pixel data pieces. The calibration image may have the same pixel data array as the image acquired from the corresponding image sensor 100.

Each gain map may include a plurality of gain values. A gain value may be a parameter for correcting the pixel value of the corresponding pixel data piece and may indicate a specific numeric value. The gain map may correspond to the size of the image acquired from the image sensor 100 or the calibration image. The size of the image or the calibration image may be represented by the number of pixel data pieces arranged in a column direction and the number of pixel data pieces arranged in a row direction.

For example, when the number of pixel data pieces included in the image or the calibration image is M×N, the number of the plurality of gain values included in the gain map may be M×N. Here, M and N are natural numbers. That is, the number of gain values may be the same as the number of pixels. Here, the plurality of gain values included in the gain map may correspond one-to-one to the plurality of pixel data pieces included in the image. Respective gain values may correspond to the locations of respective pixels.

The number of data bits to be assigned to each gain value may change with the location of the corresponding pixel. The larger a number of bits that are assigned to data, the wider a value range of the data is. For example, when calculating a gain value to which a small number of bits are assigned, the calculated gain value may be expressed within a small value range allowed by the small number of bits.

The image processor 200 according to an embodiment of the present disclosure may calculate reference gain values included in the gain map using the calibration image. In detail, the image processor 200 may calculate reference gain values corresponding to vertices of each of a plurality of block areas using the plurality of pixel data pieces included in the calibration image. The calibration image may include the plurality of block areas. The block area may be defined by a plurality of pixel locations. Accordingly, some gain values included in the gain map may be calculated. The image processor 200 may store the reference gain values in the memory 300.

The gain map may include a plurality of block areas. The gain map may include a plurality of gain values. The plurality of gain values may include the reference gain values and normal gain values. Each of the plurality of block areas may be a rectangular or square area that is defined by plural pixel locations. However, this is only an embodiment, and the plurality of block areas may be modified into respective areas having various shapes.

Each block area may include gain values corresponding to the locations of pixels. Each block area may include reference gain values. The reference gain values are gain values corresponding to some of the plurality of gain values included in the gain map. Respective reference gain values may correspond to the pixels at preset locations. The preset locations may be locations corresponding to the vertices of each block area. For example, the block area may be defined by 4×4 pixel locations (or pixel values) ranging from (1, 1) to (4, 4). The block area may include gain values corresponding to respective pixel locations from (1, 1) to (4, 4). In this case, the pixel locations (1, 1), (4, 1), (1, 4), and (4, 4) may be defined as vertices of the corresponding block area. In the block area, gain values respectively corresponding to the pixel locations (1, 1), (4, 1), (1, 4), and (4, 4) defined as vertices may be the reference gain values.

The plurality of block areas according to an embodiment of the present disclosure may include a first block area and a second block area. Here, the second block area may have a shorter distance from the center of the image thereto than the distance from the center of the image to the first block area (i.e., closer to the center of the image than the first block area), and may have a size greater than that of the first block area. In an embodiment, within an image, a size of a block area may become smaller as the block area is located farther from the center of the image. In an embodiment, within an image, a block area located closest to the center of the image may have the greatest size and a block area located closest to the edge of the image may have the smallest size.

Also, the image processor 200 may calculate gain values included in each of the plurality of block areas using the reference gain values. Here, the calculated gain values denote the remaining gain values other than the reference gain values included in each of the plurality of block areas, and hereinafter each of the remaining gain values will be referred to as a "gain value" for convenience of description. Accordingly, all gain values included in the gain map may be calculated. The image processor 200 may store the gain values included in the gain map in the memory 300.

The memory 300 may store the reference gain values included in the gain map. In an embodiment of the present disclosure, the memory 300 may store the gain values included in the gain map.

The memory 300 may be implemented as a nonvolatile memory device. For example, the memory 300 may be implemented as any of various nonvolatile memory devices such as a read-only memory (ROM) that enables only reading of data, a one-time programmable (OTP) memory that enables writing only once, an Erasable and Programmable ROM (EPROM) that enables erasure of stored data and writing of data, a NAND flash memory, and a NOR flash memory.

In accordance with an embodiment of the present disclosure, there can be provided an image sensing device and a method of operating the image sensing device, which may reduce a computational load and the amount of data to be used for image correction. Hereinafter, the present disclosure will be described in detail with reference to the attached drawings.

Figure 2:
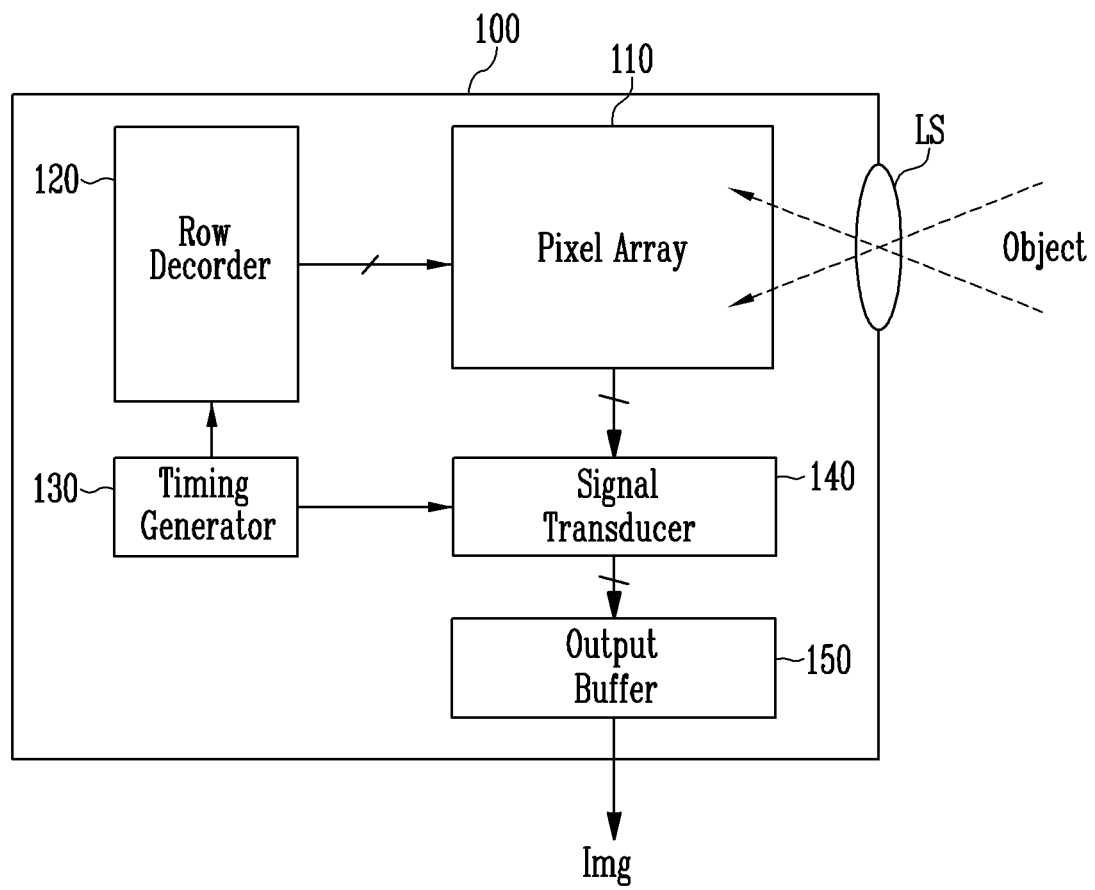
FIG. 2 is a diagram illustrating an image sensor according to an embodiment of the present disclosure.

FIG. 2 is a diagram illustrating an image sensor according to an embodiment of the present disclosure.

Referring to FIG. 2, an image sensor 100 may include an optical lens LS, a pixel array 110, a row decoder 120, a timing generator 130, a signal transducer 140, and an output buffer 150.

The optical lens LS may refract light that has been reflected from an object and has reached the optical lens LS. The light refracted through the optical lens LS may travel toward the pixel array 110. The optical lens LS may be either one lens or a set of a plurality of lenses arranged in a light-travel path. Further, the optical lens LS may include a set of micro-lenses arranged on the tops of respective pixels of the pixel array 110. The object may include at least one of various elements, such as an arbitrary item, an animal, a person, and a background present outside of the image sensor 100.

The pixel array 110 may include a color filter array and a photoelectric conversion layer. The color filter array may be disposed on the top of the photoelectric conversion layer. The photoelectric conversion layer may be disposed on the bottom of the color filter array. Here, the top and the bottom may be defined based on the direction in which light travels, and light may travel in the direction from the color filter array to the photoelectric conversion layer.

The color filter array may include a plurality of color filters. For example, each of the plurality of color filters may be one of a red color filter, a green color filter, and a blue color filter. The red color filter may transmit light having a wavelength corresponding to a red color by filtering incident light. The green color filter may transmit light having a wavelength corresponding to a green color by filtering the incident light. The blue color filter may transmit light having a wavelength corresponding to a blue color by filtering the incident light. However, this is only an embodiment, and the type of color filter, which transmits light of a specific color, may be variously changed.

The photoelectric conversion layer may include a plurality of sensing circuits. Each sensing circuit may include a photodiode and a capacitor. The photodiode may produce current corresponding to the light incident thereon through a photoelectric effect. The capacitor may accumulate charges depending on the current produced by the photodiode. Here, the amount of the accumulated charge may correspond to a pixel value indicating brightness.

The row decoder 120 may select a pixel located in a row corresponding to an address in response to the address and control signals output from the timing generator 130. The pixel array 110 may output a signal corresponding to the amount of accumulated charge from the selected pixel and provide the signal to the signal transducer 140.

The signal transducer 140 may acquire pieces of pixel data about the plurality of pixels based on respective signals output from the pixel array 110. Here, the pixel data may include a pixel value and a pixel color. When one pixel is described by way of example, the signal transducer 140 may acquire a pixel value corresponding to the amount of charge, accumulated in the capacitor in the photoelectric conversion layer, and a color corresponding to the color filter.

The output buffer 150 may output an image Img or a calibration image Cal_Img. In detail, the output buffer 150 may be implemented using a plurality of buffers which store digital signals output from the signal transducer 140. The output buffer 150 may latch and output pieces of pixel data in column units, which are provided from the signal transducer 140. The output buffer 150 may temporarily store the pieces of pixel data output from the signal transducer 140, and may sequentially output the pieces of pixel data under the control of the timing generator 130.

Figure 3A:
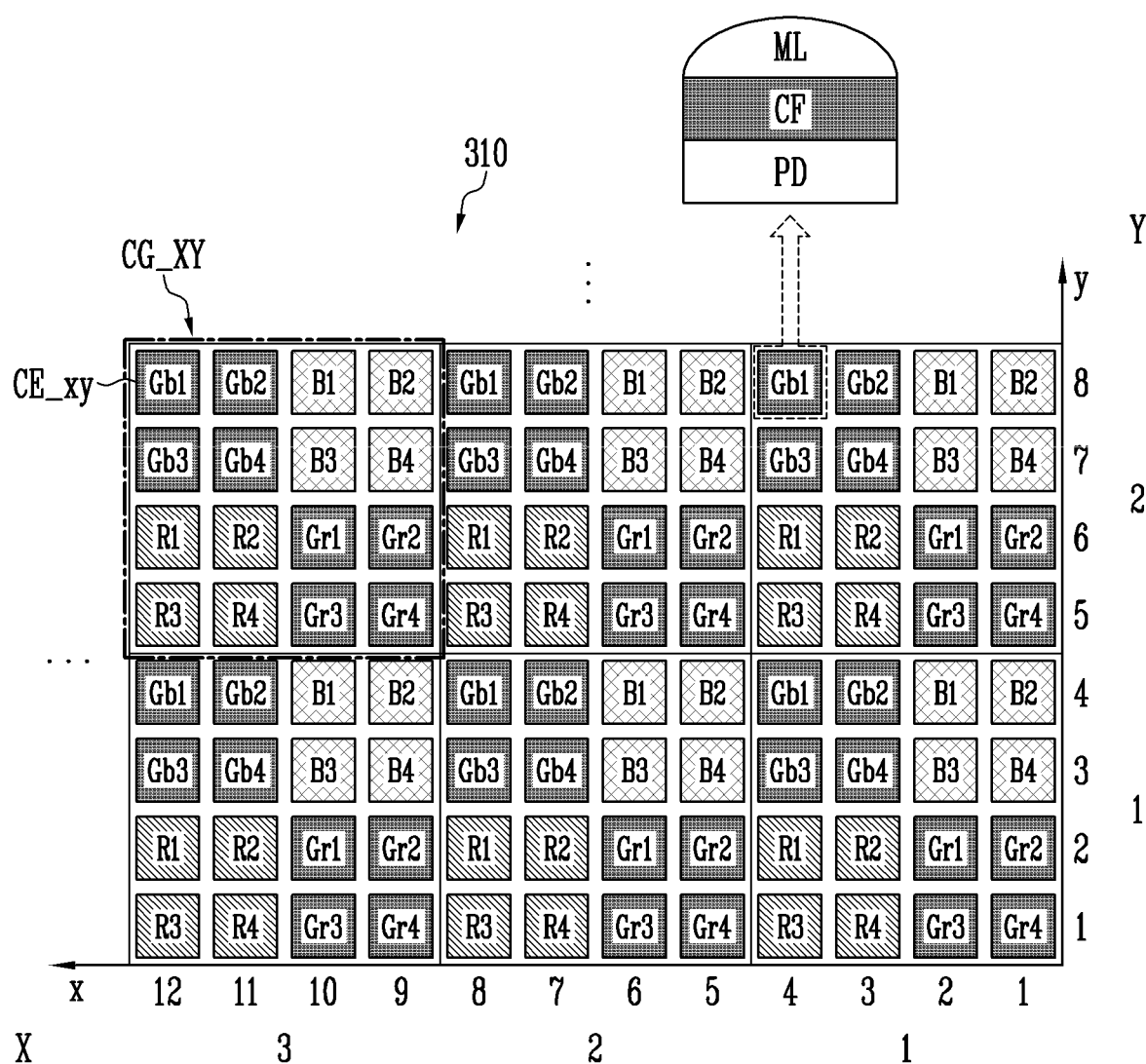
FIG. 3A is a diagram illustrating a pixel array according to an embodiment of the present disclosure.

FIG. 3A is a diagram illustrating a pixel array according to an embodiment of the present disclosure.

Referring to FIG. 3A, the pixel array 110 according to an embodiment of the present disclosure may be implemented as a pixel array 310 having a pixel structure such as that illustrated in FIG. 3A. The pixel array 310 may include a plurality of pixels. The plurality of pixels may be arranged in a column direction and a row direction. Each of the plurality of pixels may include information about the location at which the corresponding pixel is arranged. For example, a pixel CE_xy may indicate a pixel arranged at an x-th location in a column direction and a y-th location in a row direction. Here, each of x and y may be a natural number.

Each of the plurality of pixels may include a microlens ML which refracts light, a color filter CF which transmits light of a specific color, and a sensing circuit PD which detects the intensity of light. The plurality of pixels may be classified according to the type of color filter CF. For example, pixels including a red color filter may be referred to as pixels with red channels R1 to R4, pixels including a green color filter may be referred to as pixels with green channels Gr1 to Gr4 and Gb1 to Gb4, and pixels including a blue color filter may be referred to as pixels with blue channels B1 to B4.

The pixel array 310 may include a plurality of pixel groups. The plurality of pixel groups may be arranged in a column direction and a row direction. Each of the plurality of pixel groups may include information about the location at which the corresponding pixel group is arranged. For example, a pixel group CG_XY may indicate a pixel group arranged at an X-th location in a column direction and a Y-th location in a row direction. Here, each of X and Y may be a natural number.

Each pixel group may include a plurality of pixels arranged in a preset array pattern. That is, the pixel group may indicate a unit area in which an array pattern of a plurality of pixels is repeated. For example, the preset array pattern may be a quad Bayer pattern in which pixels with 2×2 first green channels Gb1 to Gb4, pixels with 2×2 blue channels B1 to B4, pixels with 2×2 red channels R1 to R4, and pixels with 2×2 second green channels Gr1 to Gr4 are arranged in a 4×4 array.

The above-described embodiment is only an embodiment, and the preset array pattern may be modified into various patterns, such as a Bayer pattern in which a pixel with a 1×1 first green channel, a pixel with a 1×1 blue channel, a pixel with a 1×1 red channel, and a pixel with a 1×1 second green channel are arranged in a 2×2 array.

Figure 3B:
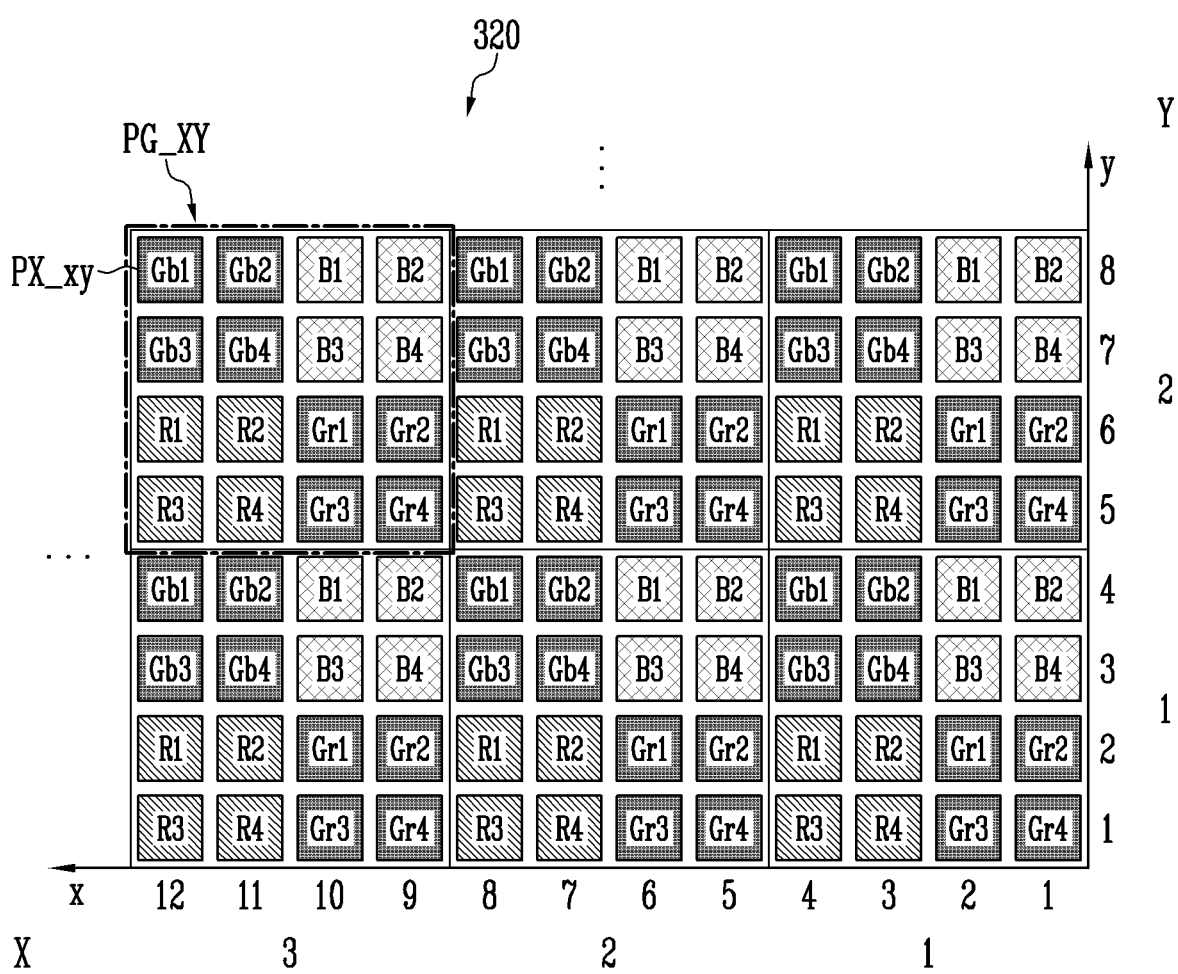
FIG. 3B is a diagram illustrating an image acquired through an image sensor according to an embodiment of the present disclosure.

FIG. 3B is a diagram illustrating an image acquired through an image sensor according to an embodiment of the present disclosure.

Referring to FIG. 3B, an image Img or a calibration image Cal_Img according to an embodiment of the present disclosure may be an image 320 having a pixel structure such as that illustrated in FIG. 3B.

The image 320 may be acquired through the image sensor 100 including the pixel array 310.

The image 320 may include a plurality of pixel data pieces. The plurality of pixel data pieces included in the image 320 may correspond to a plurality of pixels included in the pixel array 310 of the image sensor.

Each of the plurality of pixel data pieces may include information about the location at which the corresponding pixel is arranged. For example, a pixel data piece PX_xy may indicate a pixel arranged at an x-th location in a column direction and a y-th location in a row direction. Here, each of x and y may be a natural number. The pixel data piece PX_xy may correspond to the pixel CE_xy having the same location as the pixel data piece PX_xy. The pixel data piece PX_xy may include information such as a pixel value acquired from the pixel CE_xy.

The image 320 may include a plurality of pixel data groups. The plurality of pixel data groups may be arranged in a column direction and a row direction. Each of the plurality of pixel data groups may include information about the location at which the corresponding pixel data group is arranged. For example, a pixel data group PG_XY may indicate a pixel data group arranged at an X-th location in a column direction and a Y-th location in a row direction. Here, each of X and Y may be a natural number.

Each pixel data group may include a plurality of pixel data pieces arranged in a preset array pattern. That is, the pixel data group may indicate a unit area in which an array pattern of a plurality of pixel data pieces is repeated. For example, the preset array pattern may be a quad Bayer pattern in which pixel data pieces with 2×2 first green channels Gb1 to Gb4, pixel data pieces with 2×2 blue channels B1 to B4, pixel data pieces with 2×2 red channels R1 to R4, and pixel data pieces with 2×2 second green channels Gr1 to Gr4 are arranged in a 4×4 array.

The pixel data pieces included in the image 320 may be classified according to the color channel or the channel. For example, the pixel data pieces included in the image 320 may be classified into pixel data pieces with first green channels Gb1 to Gb4, pixel data pieces with blue channels B1 to B4, pixel data pieces with red channels R1 to R4, and pixel data pieces with second green channels Gr1 to Gr4 according to the color channel. Further, the pixel data pieces included in the image 320 may be classified into pixel data pieces with first to fourth channels Gb1 to Gb4, pixel data pieces with fifth to eighth channels Gr1 to Gr4, pixel data pieces with ninth to twelfth channels R1 to R4, and pixel data pieces with thirteenth to sixteenth channels B1 to B4 according to the channel.

Meanwhile, the above-described embodiment is only an embodiment, and the preset array pattern may be modified into various patterns, such as a Bayer pattern in which a pixel data piece with a 1×1 first green channel, a pixel data piece with a 1×1 blue channel, a pixel data piece with a 1×1 red channel, and a pixel data piece with a 1×1 second green channel are arranged in a 2×2 array.

Figure 4:
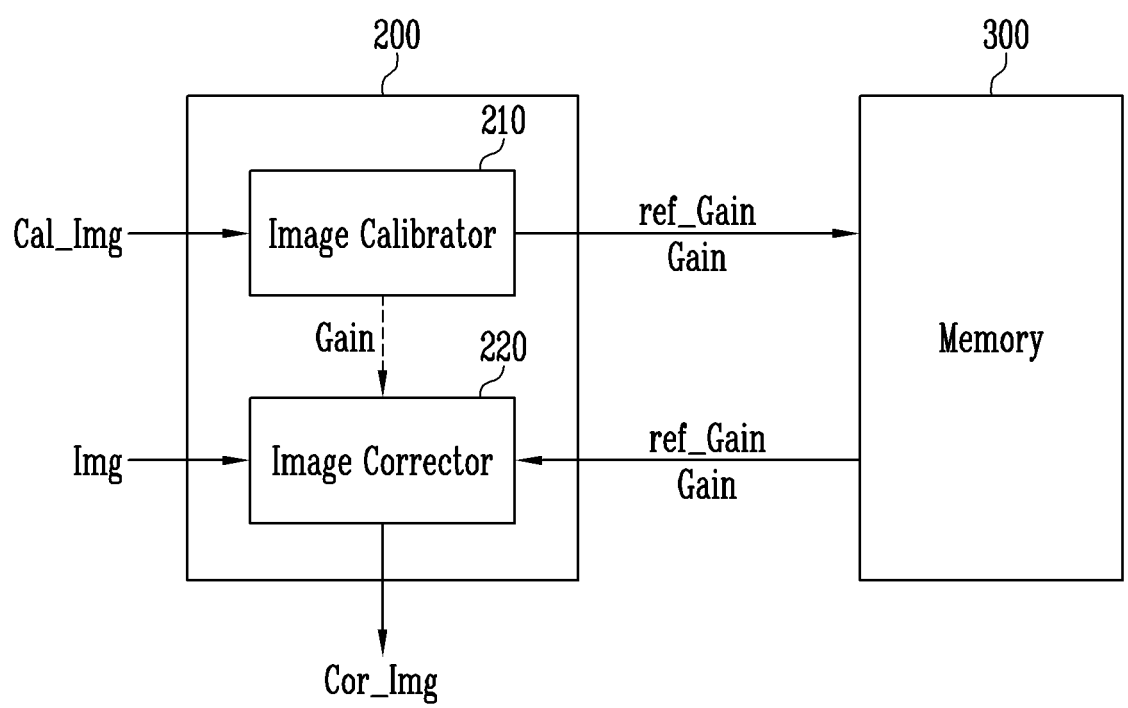
FIG. 4 is a diagram illustrating an image processor according to an embodiment of the present disclosure.

FIG. 4 is a diagram illustrating an image processor according to an embodiment of the present disclosure.

Referring to FIG. 4, the image processor 200 may include an image calibrator 210 and an image corrector 220.

The image calibrator 210 may calculate reference gain values ref_Gain using a calibration image Cal_Img acquired through the image sensor 100.

In detail, the image calibrator 210 may select pixel data pieces corresponding to vertices of each block area from among a plurality of pixel data pieces included in the calibration image Cal_Img acquired through the image sensor 100. Hereinafter, an example will be described in which a reference gain value ref_Gain which corresponds to one of the locations of the selected pixel data pieces being calculated.

The image calibrator 210 may calculate the average pixel value of pixel data pieces having the same color channel as the pixel data piece selected from among the pixel data pieces included in a region of interest including the selected pixel data piece. Here, the same color channel may be one of a first green channel, a second green channel, a red channel, and a blue channel. In an embodiment, the median value of pixel values of the pixel data pieces, instead of the average pixel value, may also be used.

The region of interest may be a region extending to a preset size based on the locations of pixel data pieces corresponding to vertices of the block area. In an embodiment, regions of interest may have the same size. In other embodiments, the regions of interest may have different sizes depending on the location of a pixel data piece that is a reference.

As an example, the same color channel as the selected pixel data piece is a first green channel.

In an embodiment, an average pixel value may be the average of the pixel values of pixel data pieces with the first green channel, among the pixel data pieces included in the region of interest. In other embodiments, an average pixel value may be the average of the pixel values of pixel data pieces with the first green channel and the pixel values of pixel data pieces with the second green channel, among the pixel data pieces included in the region of interest. Even in the case where the color channel that is the same as that of the selected pixel data piece is a second green channel, the average may be calculated in the same manner as above.

The image calibrator 210 may calculate a reference gain value ref_Gain corresponding to the selected pixel data piece using the pixel value of the selected pixel data piece and the calculated average pixel value. For example, the reference gain value ref_Gain may be the ratio of the pixel value of the selected pixel data piece to the calculated average pixel value.

For the remaining pixel data pieces, among the selected pixel data pieces, the image calibrator 210 may calculate reference gain values ref_Gain in such a manner. Further, the image calibrator 210 may store the calculated reference gain values ref_Gain in the memory 300.

The image calibrator 210 may calculate gain values Gain using the reference gain values ref_Gain.

In detail, based on the distances from a point selected in one of a plurality of block areas to vertices of the one block area and reference gain values ref_Gain corresponding to the vertices of the one block area, the image calibrator 210 may calculate a gain value Gain corresponding to the selected point. Here, the distances from the vertices to the selected point may be the distances from the pixel data pieces corresponding to the vertices to the pixel data piece corresponding to the selected point. The distances between pixel data pieces may correspond to the number of pixel data pieces present between the corresponding pixel data pieces. The distance may be a concept including at least one of a length in a column direction and a length in a row direction.

In an embodiment, the vertices of one block area may include a first vertex, a second vertex, a third vertex, and a fourth vertex of the one block area.

In this case, the image calibrator 210 may calculate a gain value Gain corresponding to the selected point based on the distance from the selected point to the first vertex, the distance from the selected point to the second vertex, the distance from the selected point to the third vertex, the distance from the selected point to the fourth vertex, the reference gain value corresponding to the first vertex, the reference gain value corresponding to the second vertex, the reference gain value corresponding to the third vertex, and the reference gain value corresponding to the fourth vertex.

In an embodiment, the plurality of block areas may include a first block area and a second block area. Here, the second block area may have a shorter distance from the center of the image thereto than the distance from the center of the image to the first block area, and may have a size greater than that of the first block area. This uses a phenomenon in which the degree of the overall distortion is lower and the degrees of distortion for respective areas are more uniform in the direction to the center of the image Img or the calibration image Cal_Img, whereas the degree of the entire distortion is higher and the degrees of distortion for respective areas are not uniform in the direction to the edge of the image or the calibration image. When a block area having a relatively large size is set in the direction to the center of the image Img or the calibration image Cal_Img and a block area having a relatively small size is set in the direction to the edge of the image Img or the calibration image Cal_Img, the reference gain value ref_Gain included in the block area closer to the center may be calculated less often. The gain value Gain may be calculated more often, but the entire computational load may be reduced when the gain value Gain is calculated using an algorithm which imposes a lower computational load than the reference gain value ref_Gain.

In an embodiment, a larger number of bits than that of gain values included in the second block area may be assigned to gain values included in the first block area. Here, the distance from the center of the image to the second block area may be shorter than the distance from the center of the image to the first block area, and the second block area may have a size greater than that of the first block area. The number of data bits to be assigned to each gain value may change with the location or area. The larger a number of bits assigned to data, the wider a value range of the data is. For example, when calculating a gain value to which a small number of bits are assigned, the calculated gain value may be expressed within a small value range allowed by the small number of bits.

When the image Img is acquired through the image sensor 100, the image corrector 220 may generate a correction image Cor_Img in which the reference gain values ref_Gain and the gain values Gain that are stored in the memory 300 are applied to the plurality of pixel data pieces included in the image. Here, the reference gain values ref_Gain and the gain values Gain may be included in the gain map. The reference gain values ref_Gain and the gain values Gain may correspond to the respective pixel data pieces included in the image.

The image corrector 220 may output the correction image Cor_Img. The image corrector 220 may output the correction image Cor_Img to the host 3000 or the device indicated by the host 3000. For example, the image corrector 220 may output the correction image Cor_Img to a processor, a display, or a storage in response to a control command received from the host 3000.

In an embodiment, the image corrector 220 may generate the correction image Cor_Img using the reference gain values ref_Gain output from the memory 300 and the gain values Gain output from the image calibrator 210 or a volatile memory. That is, the gain values Gain may not be stored in the memory 300.

For this, whenever a preset event occurs, the image calibrator 210 may calculate gain values Gain using the reference gain values ref_Gain stored in the memory 300. Here, the preset event may include an event that allows the image sensor 100 to be turned on. The image calibrator 210 may transfer the calculated gain values Gain to the image corrector 220. Alternatively, the image calibrator 210 may store the calculated gain values Gain in the volatile memory. The volatile memory may be implemented as a Static Random Access Memory (SRAM), a Dynamic RAM (DRAM) or the like.

In an embodiment, the image corrector 220 may generate the correction image Cor_Img using the reference gain values ref_Gain and the gain values Gain, which are output from the memory 300. That is, the gain values Gain may be stored, together with the reference gain values ref_Gain, in the memory 300.

Figure 5:
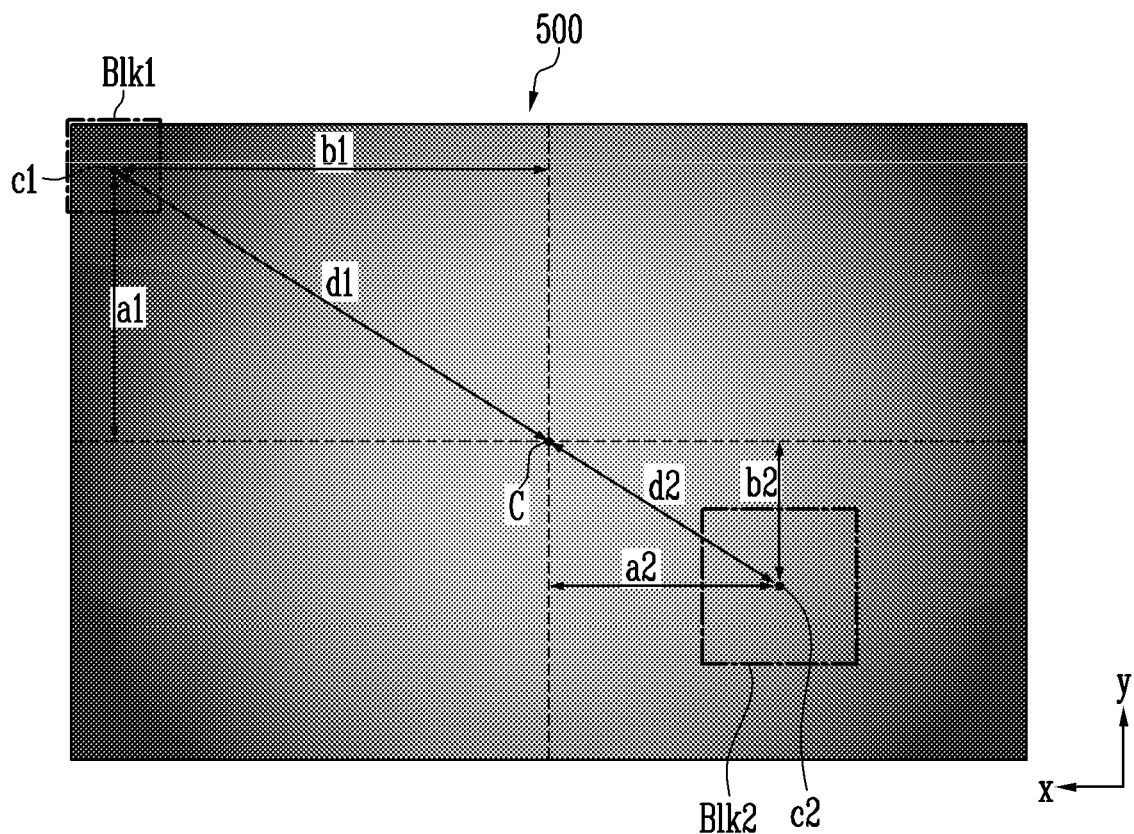
FIG. 5 is a diagram illustrating a calibration image according to an embodiment of the present disclosure.

FIG. 5 is a diagram illustrating a calibration image according to an embodiment of the present disclosure.

Referring to FIG. 5, an image sensor 100 may acquire an image 500. For example, the image 500 may be a calibration image Cal_Img acquired by the image sensor 100 to capture a white background in an environment having uniform illuminance. The image 500 may indicate the state before correction is performed. The shading of each portion of the image 500 may indicate the brightness of each pixel data piece or the pixel value of each pixel data piece. It can be seen that the difference in shading is increased in the direction from the center C of the image 500 to the edge of the image 500 farther away from the center C. It can be seen that the degree of distortion is further increased and is more non-uniform in the direction from the center C of the image 500 to the edge of the image 500.

In accordance with an embodiment of the present disclosure, a plurality of block areas Blk1 and Blk2 may be set to correct such distortion. The size of each of the plurality of block areas Blk1 and Blk2 may vary with the distance from the center C of the image 500 to the corresponding block area.

In an embodiment, the size of each of the plurality of block areas Blk1 and Blk2 may decrease as the distance from the center C of the image 500 to the corresponding block area is larger. Here, the center C of the image 500 may be the point at which the length of the image 500 in a column direction and the length of the image 500 in a row direction are halved. For example, the distance between the first block area Blk1 and the center C of the image 500 may be defined as a distance d1 between the center c1 of the first block area Blk1 and the center C of the image 500. In the same manner, the distance between the second block area Blk2 and the center C of the image 500 may be defined as a distance d2 between the center c2 of the second block area Blk2 and the center C of the image 500.

The above-described embodiment is only an embodiment, and a reference location that is the criterion for determination of the size of each block area may be changed to various locations such as the vertices of the image 500, in addition to the center C of the image 500. Also, the criterion for determining the size of each block area may be the ratio of the distance in a column direction to the distance in a row direction. For example, when a description is made based on the first block area Blk1, the ratio of the distances in the column direction may be a first ratio, obtained by dividing the distance b1 in the column direction between the center c1 of the first block area Blk1 and the center C of the image 500 by the length of the image 500 in the column direction. The ratio of the distances in the row direction may be a second ratio, obtained by dividing the distance a1 in the row direction between the center c1 of the first block area Blk1 and the center C of the image 500 by the length of the image 500 in the row direction. Further, when the first ratio and the second ratio are greater than preset values, the size of the corresponding block area may be set to a first size, whereas when the first ratio and the second ratio are less than the preset values, the size of the corresponding block area may be set to a second size greater than the first size.

Figure 6:
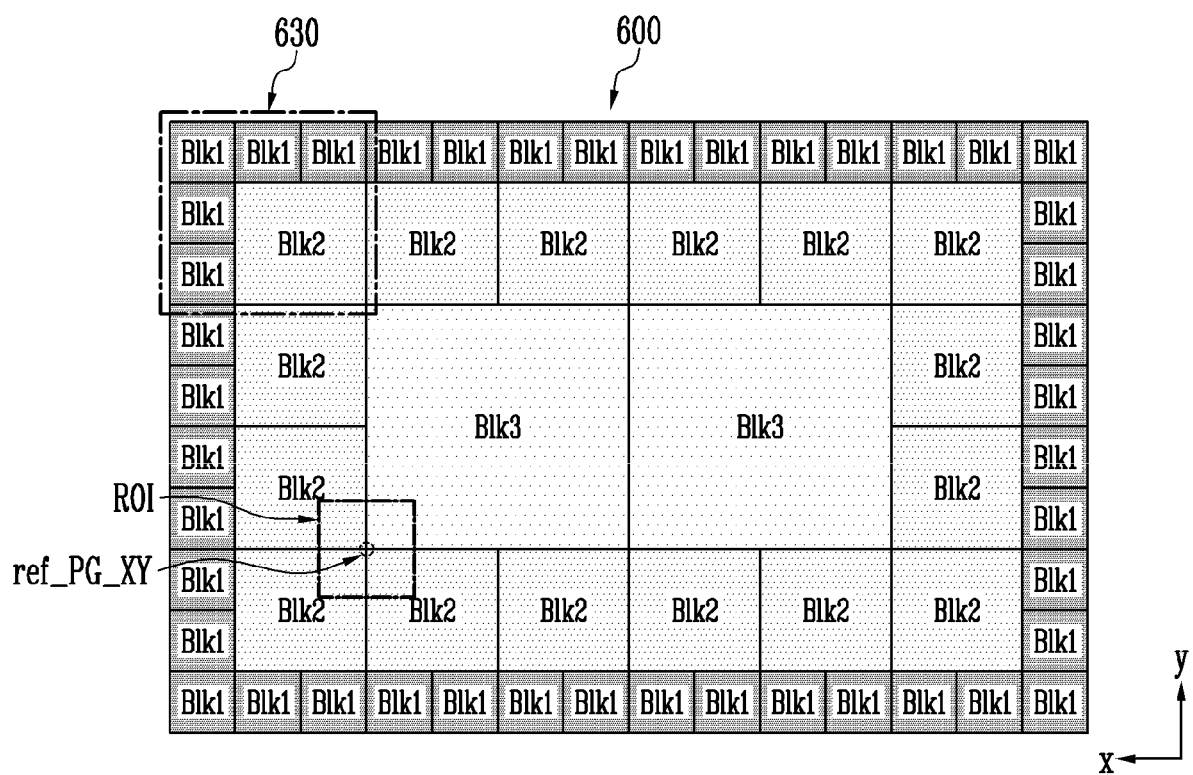
FIG. 6 is a diagram illustrating a gain map according to an embodiment of the present disclosure.

FIG. 6 is a diagram illustrating a gain map according to an embodiment of the present disclosure.

Referring to FIG. 6, a gain map 600 may correspond to the size of an image Img acquired from the image sensor 100 or a calibration image Cal_Img.

The gain map 600 may include a plurality of block areas Blk1, Blk2, and Blk3. In an embodiment, each of the plurality of block areas Blk1, Blk2, and Blk3 may be a square or rectangular area. Here, respective block areas Blk1, Blk2, and Blk3 may be logically defined areas, and each of the block areas Blk1, Blk2, and Blk3 may correspond to one area of the image Img or the calibration image Cal_Img.

The plurality of block areas Blk1, Blk2, and Blk3 may include the first block area Blk1, the second block area Blk2, and the third block area Blk3. The first block area Blk1, the second block area Blk2, and the third block area Blk3 may be arranged to correspond to the image Img or the calibration image Cal_Img. The first block area Blk1, the second block area Blk2, and the third block area Blk3 may be block areas having different sizes. The locations at which the first block area Blk1, the second block area Blk2, and the third block area Blk3 are arranged may vary with the sizes thereof. Alternatively, the sizes of the first block area Blk1, the second block area Blk2, and the third block area Blk3 may vary with the locations at which the block areas Blk1, Blk2, and Blk3 are arranged.

For example, the third block Blk3, having the largest size, may be arranged at the location at which the distance to the center of the image is the shortest. The second block area Blk2, having an intermediate size, may be arranged at the location at which the distance to the center of the image falls into an intermediate range. The first block area Blk1, having the smallest size, may be arranged at the location at which the distance to the edge of the image is the shortest.

The image processor 200 may calculate reference gain values ref_Gain using the pixel values of the pixel data pieces included in the calibration image Cal_Img and the block areas Blk1, Blk2, and Blk3.

In detail, the image processor 200 may select pixel data pieces at preset locations from among the plurality of pixel data pieces included in the calibration image Cal_Img. Here, the pixel data pieces at the preset locations may be pixel data pieces corresponding to the vertices of the block areas Blk1, Blk2, and Blk3. The pixel data pieces at the preset locations may be coupled through lines in a column direction and a row direction, and thus the block areas Blk1, Blk2, and Blk3 may be defined. One reference pixel data group ref_PG_XY may be one pixel data group PG_XY located at the location (X, Y) indicating one vertex of one block area from among the plurality of pixel data groups. One pixel data group PG_XY may include pixel data pieces with different color channels. The reference pixel data group ref_PG_XY may be located at the vertex of at least one block area Blk2 or Blk3. A vertex of one block area may be a vertex of another block area. That is, the block areas adjacent to each other may share at least one vertex.

The image processor 200 may select the regions of interest (ROI) corresponding to respective vertices of the block areas Blk1, Blk2, and Blk3. Each region of interest (ROI) may be an area having a preset size and having a reference pixel data group ref_PG_XY (i.e., a vertex) as a reference point. Here, the reference point may be a central point of a region of interest ROI. The preset size may be a fixed size. However, this is only an embodiment, and the preset size may be variable according to the location of the reference pixel data group ref_PG_XY (i.e., the vertex). The region of interest (RIO) may include pixel data pieces located in the corresponding area. A detailed embodiment thereof will be described below with reference to FIG. 7.

Figure 7:
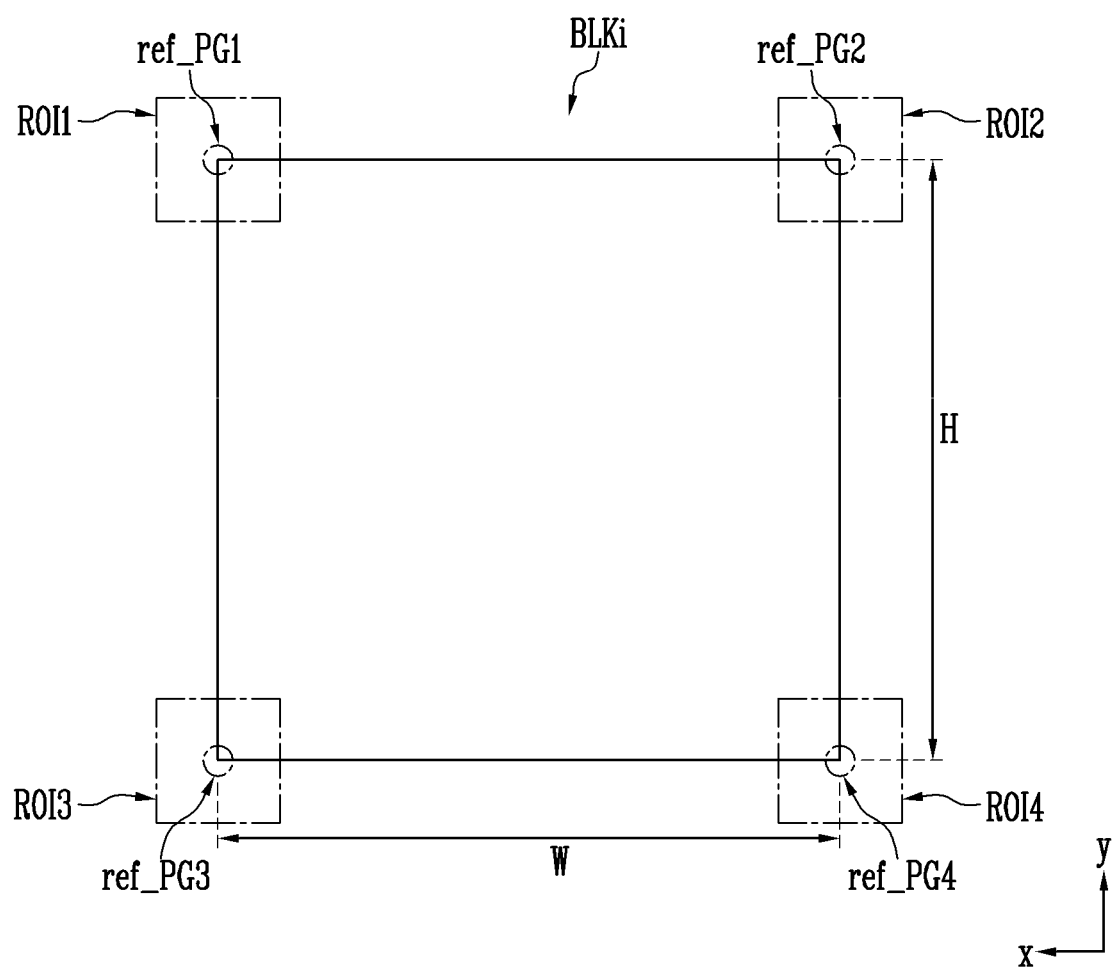
FIG. 7 is a diagram illustrating any one block area according to an embodiment of the present disclosure.

FIG. 7 is a diagram illustrating any one block area according to an embodiment of the present disclosure.

Referring to FIG. 7, the image processor 200 may select regions of interest ROI1 to ROI4 corresponding to respective vertices Ref_PG1 to Ref_PG4 of one block area BLKi.

For example, the block area BLKi may have a square or rectangular shape. The length of the block area BLKi in a column direction may be W, and the length thereof in a row direction may be H. Here, W and H may be natural numbers that are equal to or different from each other. The vertices Ref_PG1 to Ref_PG4 of the block area BLKi may include a first vertex Ref_PG1, a second vertex Ref_PG2, a third vertex Ref_PG3, and a fourth vertex Ref_PG4. The first vertex Ref_PG1, the second vertex Ref_PG2, the third vertex Ref_PG3, and the fourth vertex Ref_PG4 may be disposed at a distance of W from each other in a column direction and at a distance of H in a row direction.

In this case, the image processor 200 may select a first region of interest ROI1 having a preset size that uses the location of the first vertex Ref_PG1 as a central point, may select a second region of interest ROI2 having a preset size that uses the location of the second vertex Ref_PG2 as a central point, may select a third region of interest ROI3 having a preset size that uses the location of the third vertex Ref_PG3 as a central point, and may select a fourth region of interest ROI4 having a preset size that uses the location of the fourth vertex Ref_PG4 as a central point.

The image processor 200 may calculate reference gain values ref_Gain corresponding to the plurality of vertices Ref_PG1 to Ref_PG4 using the pixel values of the pixel data pieces included in respective areas corresponding to the plurality of regions of interest ROI1 to ROI4 in the calibration image Cal_Img. That is, the reference gain values ref_Gain of each of the plurality of vertices Ref_PG1 to Ref_PG4 may be calculated using pixel values included in each of the plurality of vertices and neighboring pixel values.

For example, the image processor 200 may calculate a reference gain value corresponding to the first vertex Ref_PG1 of the block area BLKi using the pixel values of the pixel data pieces included in the area corresponding to the first region of interest ROI1 in the calibration image Cal_Img. The image processor 200 may calculate a reference gain value corresponding to the second vertex Ref_PG2 of the block area BLKi using the pixel values of the pixel data pieces included in the area corresponding to the second region of interest ROI2 in the calibration image Cal_Img. The image processor 200 may calculate a reference gain value corresponding to the third vertex Ref_PG3 of the block area BLKi using the pixel values of the pixel data pieces included in the area corresponding to the third region of interest ROI3 in the calibration image Cal_Img. The image processor 200 may calculate a reference gain value corresponding to the fourth vertex Ref_PG4 of the block area BLKi using the pixel values of the pixel data pieces included in the area corresponding to the fourth region of interest ROI4 in the calibration image Cal_Img.

The image processor 200 may calculate the remaining gain values Gain included in the block area BLKi using the reference gain values ref_Gain corresponding to the plurality of vertices Ref_PG1 to Ref_PG4. Hereinafter, a detailed embodiment in which reference gain values are calculated will be described with reference to FIGS. 8A to 8D.

FIGS. 8A to 8D are diagrams illustrating a method of calculating reference gain values according to an embodiment of the present disclosure.

Referring to FIG. 8A, the image processor 200 may calculate reference gain values ref_Gain_xy using Equations (1-1) to (3).

In Equations (1-1) to (3) of FIG. 8A, a pixel value ref_PV_xy indicates the pixel value of a selected pixel data piece. The selected pixel data piece represents one pixel data piece selected from among the pixel data pieces included in a pixel data group PG_XY having the same arrangement locations as those of the vertices.

The case where the selected pixel data piece is one of pixel data pieces with first green channels Gb1 to Gb4 is described.

In an embodiment, as shown in Equation (1-1) of FIG. 8A, the image processor 200 may calculate the reference gain value ref_Gain_xy using the pixel value ref_PV_xy of the selected pixel data piece and the average pixel value ROI_AvgPV_G of the green channels Gb1 to Gb4 and Gr1 to Gr4. Here, the average pixel value ROI_AvgPV_G of the green channels Gb1 to Gb4 and Gr1 to Gr4 may be the average of the pixel values of the pixel data pieces with the first green channels Gb1 to Gb4 and the pixel values of the pixel data pieces with the second green channels Gr1 to Gr4, among the plurality of pixel data pieces included in the corresponding region of interest (ROI).

In an embodiment, as shown in Equation (1-2) of FIG. 8A, the image processor 200 may calculate the reference gain value ref_Gain_xy using the pixel value ref_PV_xy of the selected pixel data piece and the average pixel value ROI_AvgPV_Gb of the first green channels Gb1 to Gb4. Here, the average pixel value ROI_AvgPV_Gb of the first green channels Gb1 to Gb4 may be the average of the pixel values of the pixel data pieces with the first green channels Gb1 to Gb4, among the plurality of pixel data pieces included in the region of interest (ROI).

The case where the selected pixel data piece is one of pixel data pieces with second green channels Gr1 to Gr4 is described.

In an embodiment, as shown in Equation (1-1) of FIG. 8A, the image processor 200 may calculate the reference gain value ref_Gain_xy using the pixel value ref_PV_xy of the selected pixel data piece and the average pixel value ROI_AvgPV_G of the green channels Gb1 to Gb4 and Gr1 to Gr4.

In an embodiment, as shown in Equation (1-3) of FIG. 8A, the image processor 200 may calculate the reference gain value ref_Gain_xy using the pixel value ref_PV_xy of the selected pixel data piece and the average pixel value ROI_AvgPV_Gr of the second green channels Gr1 to Gr4. Here, the average pixel value ROI_AvgPV_Gr of the second green channels Gr1 to Gr4 may be the average of the pixel values of the pixel data pieces with the second green channels Gr1 to Gr4, among the plurality of pixel data pieces included in the region of interest (ROI).

The case where the selected pixel data piece is one of pixel data pieces with red channels R1 to R4 is described. In this case, as shown in Equation (2) of FIG. 8A, the image processor 200 may calculate the reference gain value ref_Gain_xy using the pixel value ref_PV_xy of the selected pixel data piece and the average pixel value ROI_AvgPV_R of the red channels R1 to R4. The average pixel value ROI_AvgPV_R of the red channels R1 to R4 may be the average of the pixel values of the pixel data pieces with the red channels R1 to R4, among the plurality of pixel data pieces included in the region of interest (ROI).

The case where the selected pixel data piece is one of pixel data pieces with blue channels B1 to B4 is described. In this case, as shown in Equation (3) of FIG. 8A, the image processor 200 may calculate the reference gain value ref_Gain_xy using the pixel value ref_PV_xy of the selected pixel data piece and the average pixel value ROI_AvgPV_B of the blue channels B1 to B4. The average pixel value ROI_AvgPV_B of the blue channels B1 to B4 may be the average of the pixel values of the pixel data pieces with the blue channels B1 to B4, among the plurality of pixel data pieces included in the region of interest (ROI).

Hereinafter, a method of calculating one reference gain value will be described with reference to FIGS. 8B and 8C.

Figure 8B:
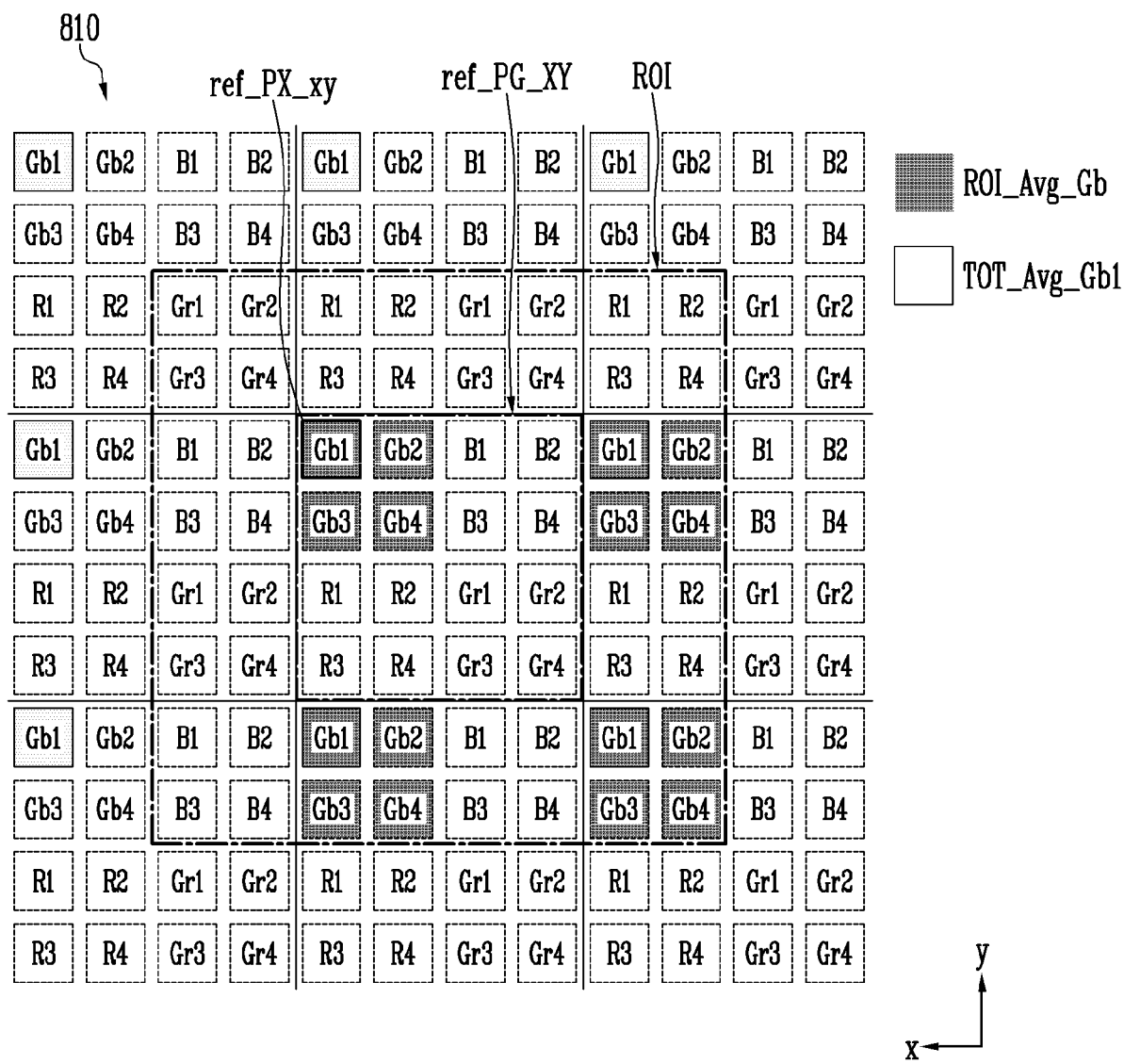
Figure 8C:
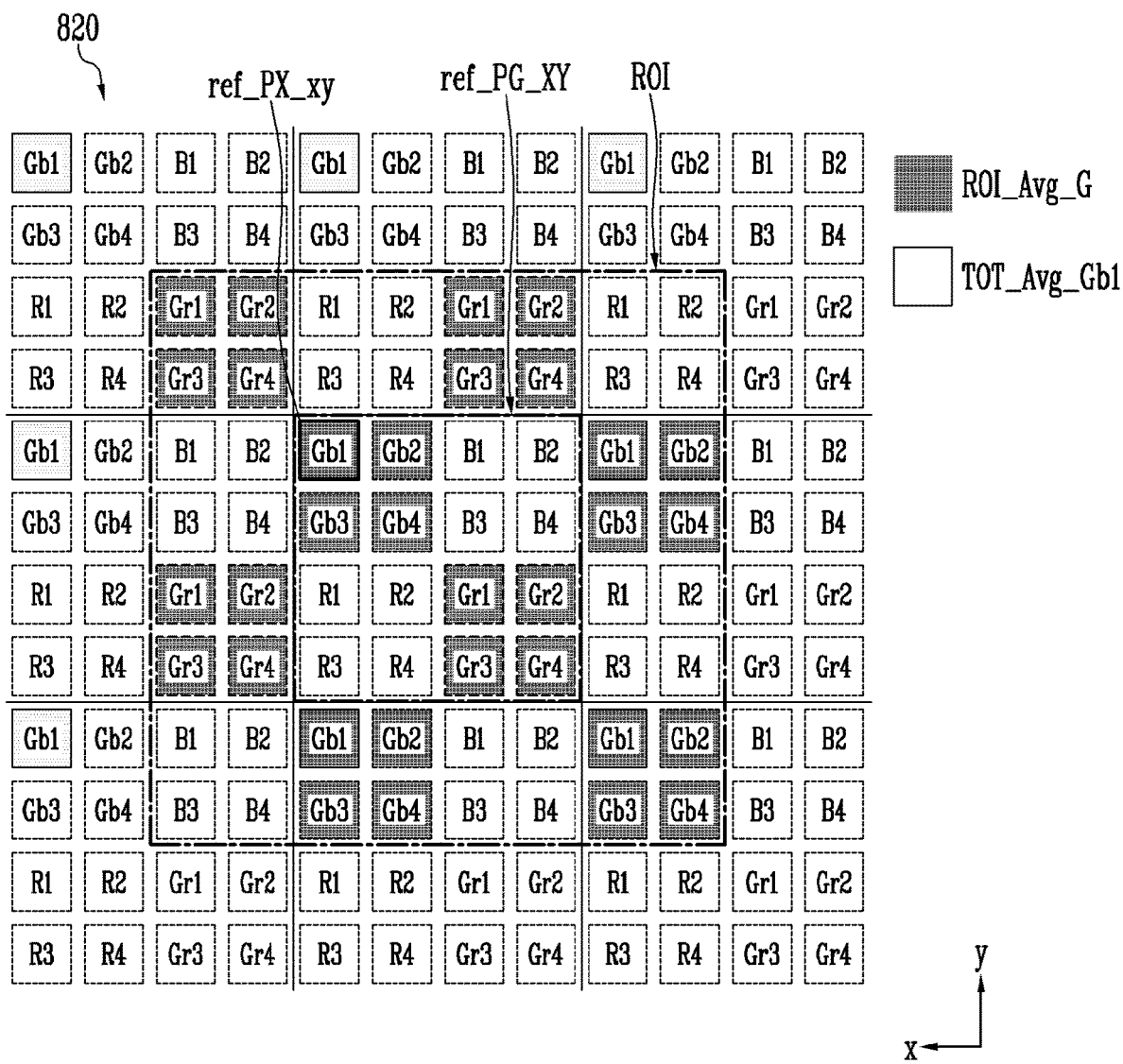

Referring to FIGS. 8B and 8C, the image processor 200 may select one pixel data piece from among pixel data pieces in a pixel data group PG_XY having the same arrangement location as that of a corresponding vertex of a block area Blki in a calibration image 810 or 820. Here, a pixel data piece having a pixel value ref_PX_xy with a first channel Gb1 disposed at (x, y) is selected.

The image processor 200 may select a region of interest (ROI), obtained by extending the pixel data group PG_XY as a central area to a preset size, in the calibration image 810 or 820.

In an embodiment, as illustrated in FIG. 8B, the image processor 200 may select pixel data pieces ROI_Avg_Gb with first green channels Gb1 to Gb4 which are the color channels identical to that of the selected pixel data piece having the pixel value ref_PX_xy, from among the plurality of pixel data pieces included in the region of interest (ROI) in the image 810. The image processor 200 may calculate an average pixel value ROI_AvgPV_Gb which is the average of the pixel values of the selected pixel data pieces ROI_Avg_Gb. As shown in Equation (1-2) of FIG. 8A, the image processor 200 may calculate a reference gain value ref_Gain_xy for the location (x, y) using the pixel value ref_PV_xy of the pixel data piece selected at the location (x, y) and the average pixel value ROI_AvgPV_Gb. In this manner, reference gain values for other locations may be calculated. In an embodiment, the pixel value ref_PV_xy in the Equation (1-2) of FIG. 8A may be replaced with an average value TOT_Avg_Gb1 of Gb1 pixel values included in the ROI.

In an embodiment, as illustrated in FIG. 8C, the image processor 200 may select pixel data pieces ROI_Avg_G with first green channels Gb1 to Gb4 and second green channels Gr1 to Gr4 which are the type of color channels identical to that of the selected pixel data piece having the pixel value ref_PX_xy, from among the plurality of pixel data pieces included in the region of interest (ROI) in the image 820. The image processor 200 may calculate an average pixel value ROI_AvgPV_G which is the average of the pixel values of the selected pixel data pieces ROI_Avg_G. As shown in Equation (1-1) of FIG. 8A, the image processor 200 may calculate a reference gain value ref_Gain_xy for the location (x, y) using the pixel value ref_PV_xy of the pixel data piece selected at the location (x, y) and the average pixel value ROI_AvgPV_G. In this manner, reference gain values for other locations may be calculated. In an embodiment, the pixel value ref_PV_xy in the Equation (1-1) of FIG. 8A may be replaced with the average value TOT_Avg_Gb1 of Gb1 pixel values included in the ROI.

Referring back to FIG. 6, the first blocks Blk1 having the smallest size, among the plurality of blocks Blk1, Blk2, and Blk3, may be arranged in an edge area 630. In accordance with an embodiment of the present disclosure, in the case of the first blocks Blk1 arranged in the edge area 630, the reference gain value of the first blocks Blk1 may be calculated through a mirroring method. This will be described below with reference to FIG. 8D.

Figure 8D:
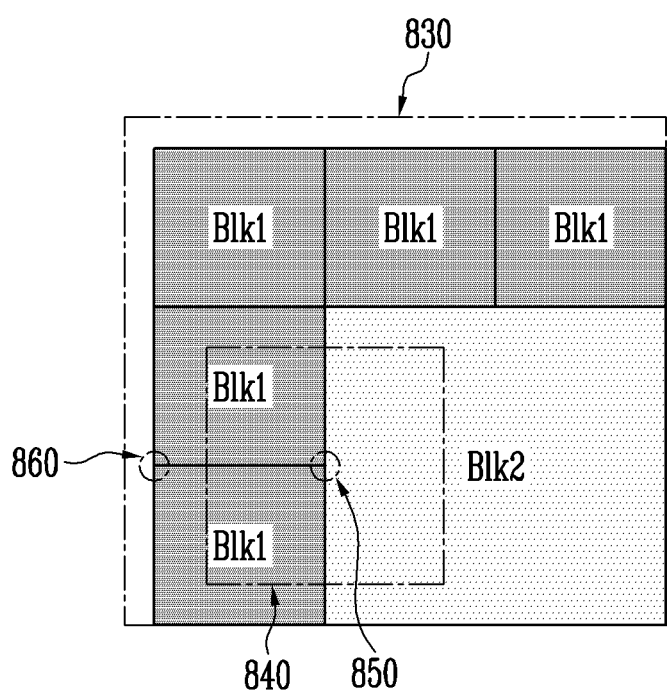

Referring to FIG. 8D, in an edge area 830, first blocks Blk1 having the smallest size may be arranged, and a plurality of vertices 850 and 860 of the first blocks Blk1 may include a first vertex 850 having a shorter distance from the center of an image (i.e., closer to the center) than a second vertex 860. The second vertex 860 may be closest to the first vertex 850 among all vertices of all block areas. That is, the second vertex 860 may be a vertex disposed in the outermost location at the edge of the image, among all of the vertices.

The image processor 200 may calculate first reference gain values corresponding to the first vertex 850 closer to the center. In detail, the image processor 200 may select the reference pixel data group ref_PG_XY corresponding to the location (X, Y) of the first vertex 850 from the calibration image Cal_Img and may select a region of interest 840 based on the reference pixel data group ref_PG_XY. The image processor 200 may calculate first reference gain values corresponding to location (X, Y) using the pixel values ref_PV_xy of the pixel data pieces included in the reference pixel data group ref_PG_XY and the pixel data pieces included in the region of interest 840.

Further, the image processor 200 may copy the first reference gain value corresponding to the first vertex 850 to a second reference gain value corresponding to the second vertex 860. That is, the second reference gain value of the second vertex 860 may be the same values as the first reference gain value of the first vertex 850.

Figure 9A:
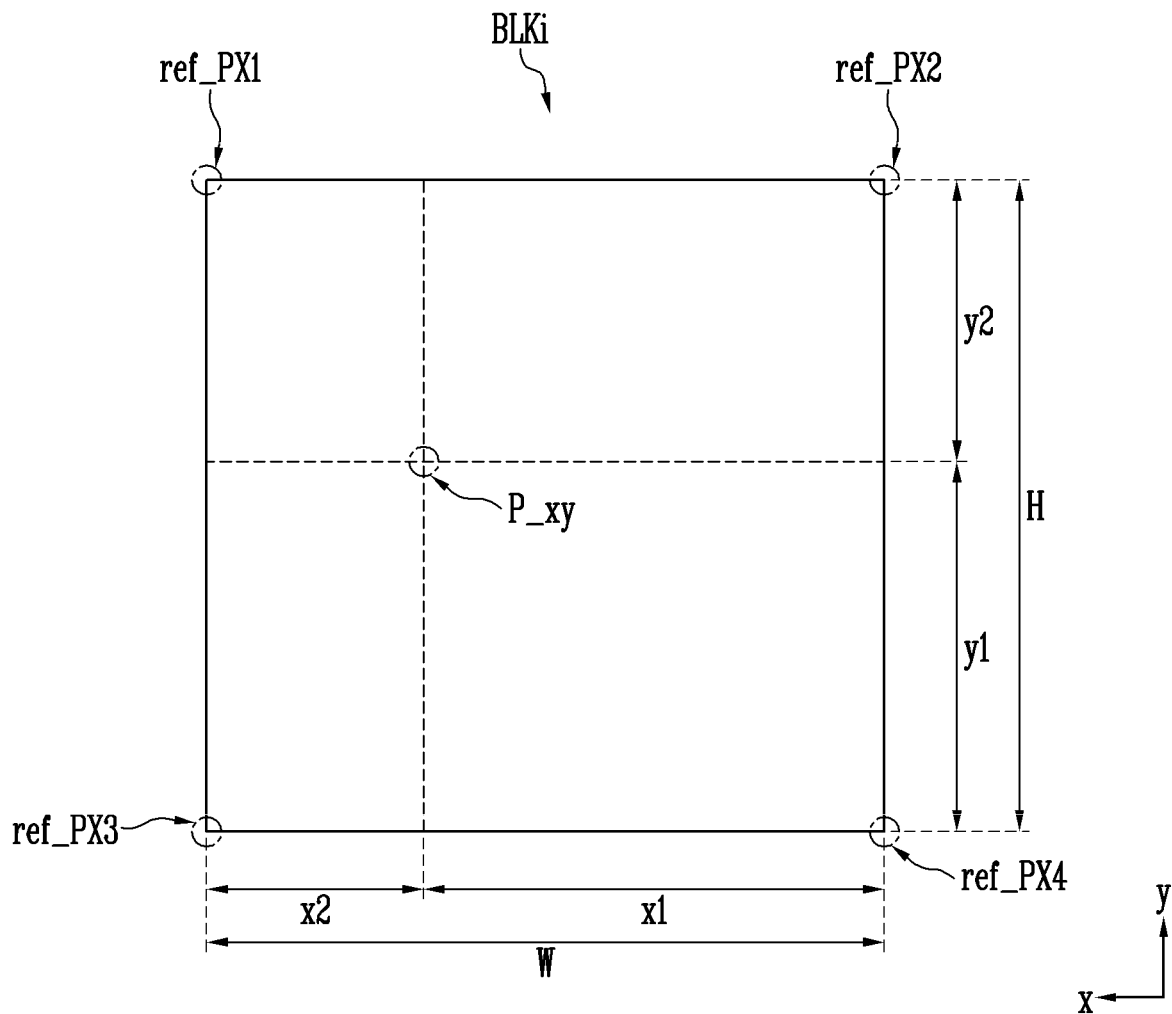
FIGS. 9A and 9B are diagrams illustrating a method of calculating gain values according to an embodiment of the present disclosure.
Figure 9B:
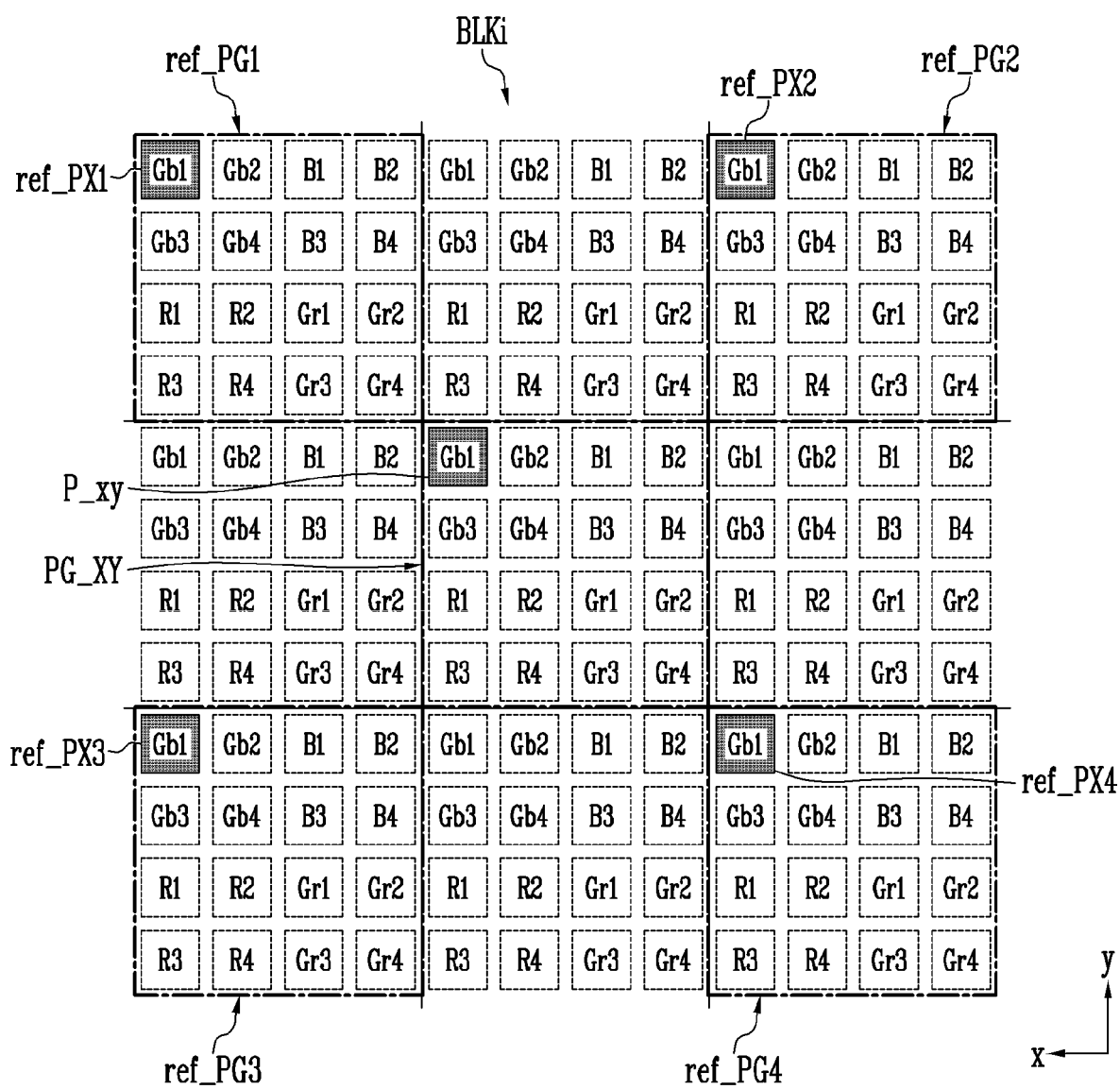

FIGS. 9A and 9B are diagrams illustrating a method of calculating gain values according to an embodiment of the present disclosure.

Referring to FIGS. 9A and 9B, one block area Blki may be defined by a plurality of vertices. The one block area Blki may include therein points having a specific location. One point may correspond to one pixel having the same location.

The image processor 200 may calculate gain values respectively corresponding to a plurality of points included in one block area Blki using reference gain values ref_PX1 to ref_PX4 corresponding to a plurality of vertices that define the one block area Blki. In this case, the image processor 200 may calculate the gain values of the same channel using the reference gain values ref_PX1 to ref_PX4 corresponding to the plurality of vertices of the same channel. Here, a method of calculating a gain value Gain_P_xy corresponding to one point P_xy, among the plurality of points included in one block area Blki, is described. Here, the channel is a first channel Gb1.

The image processor 200 may acquire a distance W in a column direction and a distance H in a row direction between the plurality of vertices defining one block area Blki. For example, the image processor 200 may acquire the distance W in the column direction and the distance H in the row direction based on the differences between the locations of the plurality of vertices.

The image processor 200 may acquire distances x1 and x2 in the column direction and distances y1 and y2 in the row direction between respective vertices defining one block area Blki and one selected point P_xy. For example, the image processor 200 may acquire the distances x1 and x2 in the column direction and the distances y1 and y2 in the row direction based on the differences between the locations of the respective vertices and one selected point P_xy.

The image processor 200 may calculate the gain value Gain_P_xy corresponding to one point P_xy using the reference gain values ref_PX1 to ref_PX4 respectively corresponding to the plurality of vertices, the distances x1, x2, and W in the column direction, and the distances y1, y2, and H in the row direction based on the equation shown in FIG. 9A.

FIG. 10 is a diagram illustrating a correction image according to an embodiment of the present disclosure.

Referring to FIG. 10, the image processor 200 may generate a correction image Cor_Img by applying a gain map (Gain map) to an image Img acquired through the image sensor 100.

In detail, the image processor 200 may multiply the pixel value I_xy of a pixel data piece at a location (x, y), selected from among a plurality of pixel data pieces included in the image Img, by a gain value Gain_xy corresponding to the selected location (x, y), among a plurality of reference gain values and a plurality of gain values which are included in the gain map. In this case, the image processor 200 may generate a correction image Cor_Img having result values O_xy, obtained by multiplying pixel values I_xy by respective gain values Gain_xy for respective locations, as pixel values.

That is, the pixel values of the plurality of pixel data pieces included in the correction image Cor_Img may be the result values obtained by multiplying the pixel values of the plurality of pixel data pieces, which are included in the image Img, by the plurality of reference gain values and the plurality of gain values, which are included in the gain map, for respective corresponding locations.

Figure 11:
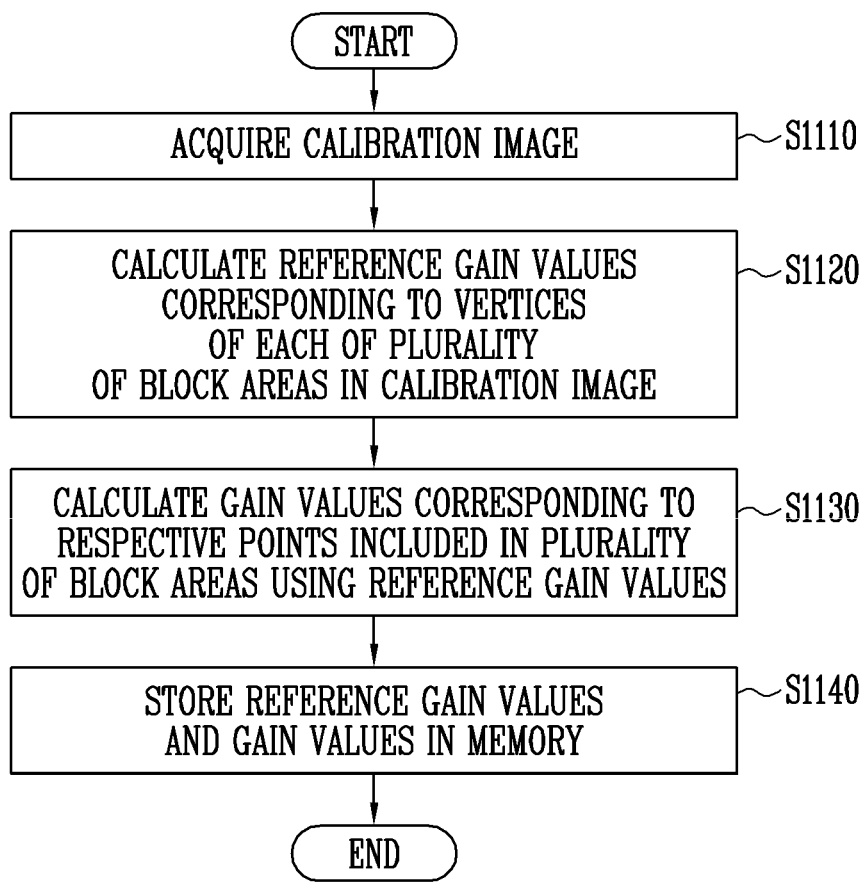
FIG. 11 is a flowchart illustrating a method of operating an image sensing device according to an embodiment of the present disclosure.

FIG. 11 is a flowchart illustrating a method of operating an image sensing device according to an embodiment of the present disclosure.

Referring to FIG. 11, the method of operating the image sensing device 1000 according to an embodiment of the present disclosure may acquire a calibration image Cal_Img through the image sensor 100 at operation S1110.

Reference gain values corresponding to vertices of each of the plurality of block areas Blk1, Blk2, and Blk3 in the calibration image Cal_Img may be calculated at step S1120. That is, the reference gain values corresponding to the vertices defined by the plurality of block areas Blk1, Blk2, and Blk3 included in the gain map corresponding to the size of the calibration image Cal_Img may be calculated. In an embodiment, each of the plurality of block areas Blk1, Blk2, and Blk3 may be a rectangular or square area.

Here, the plurality of block areas Blk1, Blk2, and Blk3 may include a first block area Blk1 and a second block area Blk2, which is closer to the center of the calibration image Cal_Img than the first block area Blk1 and has a size greater than that of the first block area Blk1.

In an embodiment, the operation of calculating the reference gain values may include the operation of selecting pixel data pieces, corresponding to the vertices of the plurality of block areas Blk1, Blk2, and Blk3, from among a plurality of pixel data pieces included in the calibration image Cal_Img acquired through the image sensor 100, the operation of calculating the average pixel value of pixel data pieces with a selected color channel from among pixel data pieces included in a region of interest (ROI) including one of the selected pixel data pieces, and the operation of calculating one reference gain value, among reference gain values, using the pixel value of the selected pixel data piece and the average pixel value.

In an embodiment, the same color channel may be a color channel corresponding to one of a first green channel, a second green channel, a red channel, and a blue channel.

In an embodiment, the same color channel may be a color channel corresponding to one of the first green channel and the second green channel. In this case, the average pixel value may include the average of the pixel values of pixel data pieces with the first green channel and the pixel values of pixel data pieces with the second green channel, among the pixel data pieces included in the region of interest.

Further, gain values corresponding to respective points included in the plurality of block areas Blk1, Blk2, and Blk3 may be calculated using the reference gain values at operation S1130.

In an embodiment, the operation of calculating the gain values may include the operation of calculating a gain value corresponding to a point selected in one block area Blki of the plurality of block areas Blk1, Blk2, and Blk3, based on distances from the selected point to vertices of the one block area Blki and the reference gain values corresponding to the vertices of the one block area Blki.

In an embodiment, the vertices of one block area Blki may include a first vertex, a second vertex, a third vertex, and a fourth vertex of the one block area Blki. In this case, the operation of calculating the gain value corresponding to the selected point may be configured to calculate the gain value corresponding to the selected point based on the distance from the selected point to the first vertex, the distance from the selected point to the second vertex, the distance from the selected point to the third vertex, the distance from the selected point to the fourth vertex, the reference gain value corresponding to the first vertex, the reference gain value corresponding to the second vertex, the reference gain value corresponding to the third vertex, and the reference gain value corresponding to the fourth vertex.

Further, the reference gain values and the gain values may be stored in the memory 300 at operation S1140.

In an embodiment, a larger number of bits than that of gain values included in the second block area Blk2 may be assigned to gain values included in the first block area Blk1.

In an embodiment, the operating method of the image sensing device 1000 may calculate, from a calibration image, reference gain values of reference locations within each of block areas. The operating method may generate a gain map by calculating remaining gain values of remaining locations within the block area based on the reference gain values of the block area, the gain map including the reference gain values and the remaining gain values corresponding to respective pixel data pieces within the block area. The operating method may generate a corrected image by applying the gain map to an input image. Here, the calibration image and the input image may have a geometrically identical array of pixel data. The block areas may be divided into two or more groups located in respective layer regions, which are radially layered with reference to a center of the calibration image. The block areas located in one of the layer regions may have an identical size. The block area located in the layer region relatively closer to the center may have a greater size than a block area located in the layer region relatively farther from the center.

In an embodiment, the reference locations may be vertices of the block area.

Figure 12:
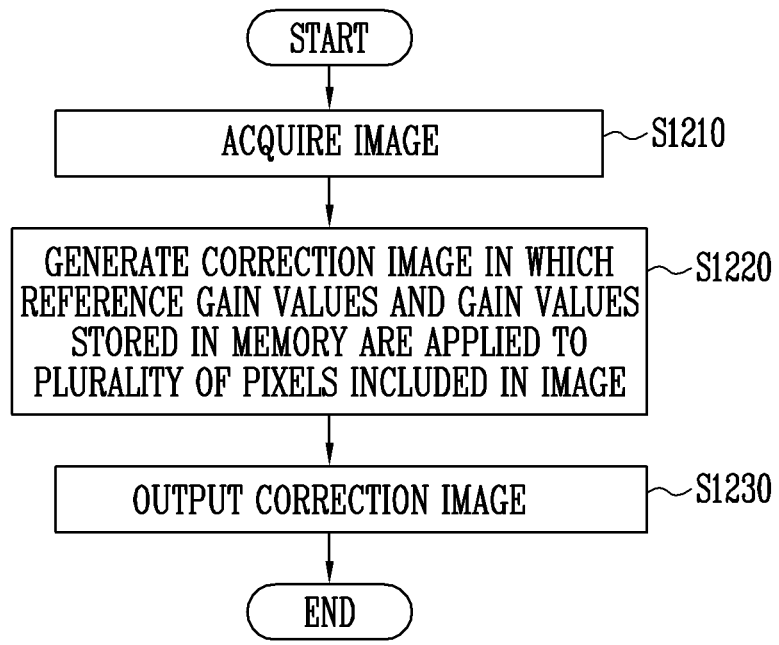
FIG. 12 is a flowchart illustrating a method of operating an image sensing device according to an embodiment of the present disclosure.

FIG. 12 is a flowchart illustrating a method of operating an image sensing device according to an embodiment of the present disclosure.

Referring to FIG. 12, the method of operating the image sensing device 1000 according to an embodiment of the present disclosure may acquire an image Img through the image sensor 100 at operation S1210. When a capturing command is received from the host 3000, the image sensing device 1000 may acquire the image Img through the image sensor 100.

Further, a correction image Cor_Img in which reference gain values and gain values stored in the memory 300 are applied to a plurality of pixel data pieces may be generated at operation S1220. The reference gain values and the gain values stored in the memory 300 may be included in a gain map. The gain map may correspond to the size of a calibration image Cal_Img or the image Img. The reference gain values and the gain values included in the gain map may correspond to the plurality of pixels.

Further, the correction image Cor_Img may be output at operation S1230. The image sensing device 1000 may output the correction image Cor_Img to the host 3000. Alternatively, the image sensing device 1000 may output the correction image Cor_Img to a device indicated by the host 3000. For example, the correction image Cor_Img may be output to an external device of the image sensing device 1000, such as a storage device, a processor, or a display.

Figure 13:
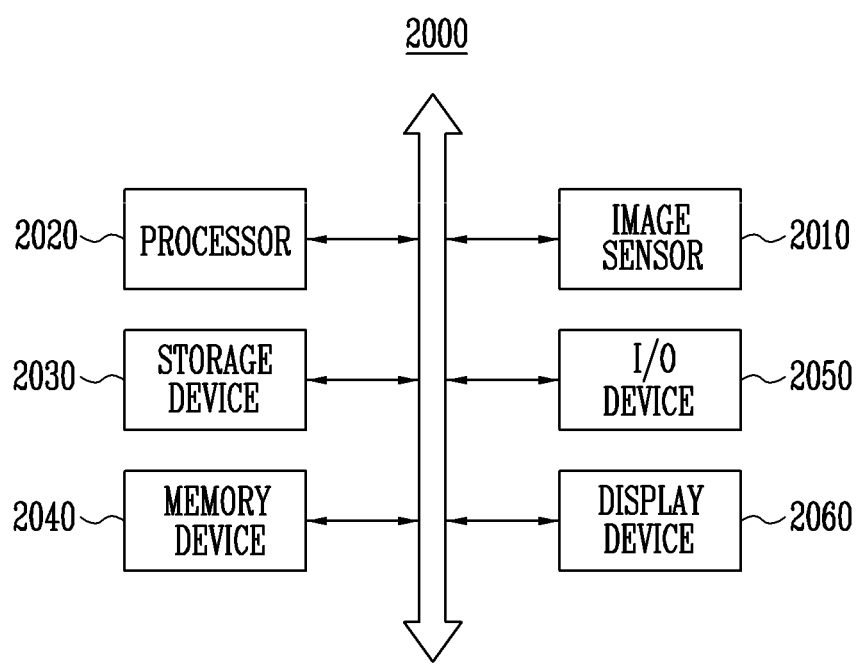
FIG. 13 is a diagram illustrating a computing system including an image sensing device according to the embodiment of the present disclosure.

FIG. 13 is a diagram illustrating a computing system including an image sensing device according to the embodiment of the present disclosure.

Referring to FIG. 13, a computing system 2000 may include an image sensor 2010, a processor 2020, a storage device 2030, a memory device 2040, an input/output device 2050, and a display device 2060. Although not illustrated in FIG. 13, the computing system 2000 may further include a port through which the computing system 2000 is capable of communicating with the storage device 2030, the memory device 2040, the input/output (I/O) device 2050, the display device 2060 or the like, or which is capable of communicating with an external device.

The image sensor 2010 may acquire an image or a calibration image. The image sensor 2010 may store a gain map. The image sensor 2010 may generate a correction image Cor_Img in which the gain map is applied to the acquired image. The image sensor 2010 may be coupled to the processor 2020 through an address bus, a control bus, and a data bus or an additional communication link different from the buses, and may then communicate with the processor 2020. Here, the description of the above-described image sensing device 1000 may be applied to the image sensor 2010.

The image sensor 2010 may be implemented in various types of packages. For example, at least some components of the image sensor 2010 may be implemented using any of packages such as Package on Package (PoP), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline Integrated Circuit (SOIC), Shrink Small Outline Package (SSOP), Thin Small Outline Package (TSOP), System In Package (SIP), Multi Chip Package (MCP), Wafer-level Fabricated Package (WFP), and Wafer-Level Processed Stack Package (WSP). In accordance with an embodiment, the image sensor 2010 and the processor 2020 may be integrated into a single chip, or may be integrated into different chips, respectively.

The processor 2020 may control the overall operation of the computing system 2000. The processor 2020 may control the display device 2060 so that the correction image Cor_Img is displayed. The processor 2020 may store the correction image Cor_Img in the storage device 2030. Here, the above description of the host 3000 may be applied to the processor 2020.

The processor 2020 may perform specific calculations or tasks. In accordance with an embodiment of the present disclosure, the processor 2020 may include at least one of a central processing unit (CPU), an application processing unit (APU), and a graphics processing unit (GPU).

The processor 2020 may be coupled to the storage device 2030, the memory device 2040, and the input/output device 2050 through the address bus, the control bus, and the data bus, and may then communicate with the devices. In accordance with an embodiment of the present disclosure, the processor 2020 may also be coupled to an expansion bus such as a Peripheral Component Interconnect (PCI) bus.

The storage device 2030 may store data such as the correction image Cor_Img. Here, the data stored in the storage device 2030 may be retained not only when the computing system 2000 is driven but also when the computing system 2000 is not driven. For example, the storage device 2030 may be implemented as at least one of all types of nonvolatile memory devices such as a flash memory device, a solid state drive (SSD), a hard disk drive (HDD), and an optical disk.

The memory device 2040 may store data such as the correction image Cor_Img. Here, the data stored in the memory device 2040 may be retained only when the computing system 2000 is driven. Alternatively, the data stored in the memory device 2040 may be retained when the computing system 2000 is driven or not driven. For example, the memory device 2040 may include a volatile memory device such as a Dynamic Random Access Memory (DRAM) or a Static Random Access Memory (SRAM), and a nonvolatile memory device such as an Erasable Programmable Read-Only Memory (EPROM), an Electrically Erasable Programmable Read-Only Memory (EEPROM), or a flash memory device.

The input/output device 2050 may include an input device and an output device. The input device may be a device that is capable of inputting a user's command through interaction, and may be implemented as, for example, a keyboard, a keypad, a mouse, or a microphone. The output device may be a device that is capable of outputting data, and may be implemented as, for example, a printer or a speaker.

The display device 2060 may be a device that visually outputs data, such as the correction image. For this operation, the display device 2060 may be implemented as any of various types of display devices, such as a Liquid Crystal Display (LCD) which uses a separate backlight unit (e.g., a light emitting diode (LED) or the like) as a light source and controls the degree of transmission of light (e.g., brightness or intensity of light) emitted from a backlight unit through liquid crystal by controlling the molecular arrangement of the liquid crystal, and a display device which uses a self-emissive element (e.g., a mini LED having a size of 100 to 200 um, a micro LED having a size of 100 um or less, an Organic LED (OLED), a Quantum dot LED (QLED), or the like) as a light source without requiring a separate backlight unit or liquid crystal.

The display device 2060 may include a plurality of pixels. The plurality of pixels of the display device 2060 may correspond in location to the plurality of pixel data pieces of the correction image Cor_Img. The plurality of pixels of the display device 2060 may emit light with luminance values corresponding to respective pixel values of the plurality of pixel data pieces of the correction image Cor_Img, and thus an image may be displayed. The display device 2060 may include a plurality of driving circuits corresponding to a plurality of pixels. Here, each driving circuit may be implemented in a form such as an amorphous silicon (a-Si) thin film transistor (TFT), a low temperature poly silicon (LTPS) TFT, or an organic TFT (OTFT).

In an embodiment, the display device 2060 may be implemented as a flexible display having characteristics in which the shape of the display device 2060 is bendable and restorable. In an embodiment, the display device 2060 may be implemented as a transparent display having light-transmissive characteristics. In an embodiment, the display device 2060 may be implemented as a touch display after being combined with a touch sensor for identifying a location touched by the user.

The present disclosure may provide an image sensing device and a method of operating the image sensing device, which may reduce the computational load and the amount of data to be used for image correction.

While the present disclosure has been illustrated and described with respect to specific embodiments and drawings, the disclosed embodiments are not intended to be restrictive. Further, it is noted that the present disclosure may be achieved in various ways through substitution, change, and modification, as those skilled in the art will recognize in light of the present disclosure, without departing from the spirit and/or scope of the present disclosure and the following claims. Furthermore, the embodiments may be combined to form additional embodiments

What is claimed is:

1. An image sensing device, comprising:
    an image sensor configured to acquire an image including a plurality of pixel values;
    a memory configured to store reference gain values corresponding to vertices of each of a plurality of block areas included in the image; and
    an image processor configured to:
    calculate at least one gain value included in each of the plurality of block areas based on distances between the at least one gain value and the reference gain values, and
    output a correction image comprising a correction pixel value obtained by correcting a selected pixel value among the plurality of pixel values based on a selected gain value corresponding to the selected pixel value among the reference gain values and the at least one gain value,
    wherein the plurality of block areas include a first block area and a second block area having a shorter distance from a center of the image than the first block area and having a size greater than that of the first block area.

2. The image sensing device according to claim 1, wherein a larger number of bits are assigned to each gain value included in the first block area than a number of bits assigned to each gain value included in the second block area.

3. The image sensing device according to claim 1, wherein the image processor comprises an image calibrator configured to:
    select pixel values, corresponding to the vertices of each of the plurality of block areas, from among a plurality of pixel values included in a calibration image acquired through the image sensor,
    calculate an average pixel value of pixel values, having a color channel identical to a color channel of one of the selected pixel values, among pixel values included in a region of interest including each of the selected pixel values, and
    calculate one reference gain value among the reference gain values using a pixel value of each of the selected pixel values and the average pixel value.

4. The image sensing device according to claim 3, wherein the identical color channel is one of a first green channel, a second green channel, a red channel, and a blue channel.

5. The image sensing device according to claim 3, wherein:
    the identical color channel is one of a first green channel and a second green channel, and
    the average pixel value includes an average of pixel values with the first green channel and pixel values with the second green channel, among the pixel values included in the region of interest.

6. The image sensing device according to claim 1, wherein the image processor comprises an image calibrator configured to calculate the gain value corresponding to a point selected in one of the plurality of block areas based on distances from the selected point to vertices of the one block area and the reference gain values corresponding to the vertices of the one block area.

7. The image sensing device according to claim 6, wherein:
    the vertices of the one block area include a first vertex, a second vertex, a third vertex, and a fourth vertex of the one block area, and
    the image calibrator calculates the gain value corresponding to the selected point based on a distance from the selected point to the first vertex, a distance from the selected point to the second vertex, a distance from the selected point to the third vertex, a distance from the selected point to the fourth vertex, the reference gain value corresponding to the first vertex, the reference gain value corresponding to the second vertex, the reference gain value corresponding to the third vertex, and the reference gain value corresponding to the fourth vertex.

8. The image sensing device according to claim 1, wherein the image processor is further configured to store the reference gain values and the at least one gain value included in each of the plurality of block areas in the memory.

9. The image sensing device according to claim 8, wherein the image processor comprises an image corrector configured to generate, when the image is acquired through the image sensor, the correction image in which the reference gain values and the at least one gain value that are stored in the memory are applied to the plurality of pixel values included in the image.

10. The image sensing device according to claim 1, wherein each of the plurality of block areas is a rectangular or square area.

11. A method of operating an image sensing device, comprising:
    calculating reference gain values corresponding to vertices of each of a plurality of block areas included in a calibration image acquired through the image sensing device;
    calculating at least one gain value included in each of the plurality of block areas based on distances between the at least one gain value and the reference gain values;
    storing the reference gain values and the at least one gain value included in each of the plurality of block areas in a memory; and
    when an image is acquired through the image sensing device, outputting a correction image comprising a correction pixel value obtained by correcting a selected pixel value among the plurality of pixel values based on a selected gain value corresponding to the selected pixel value among the reference gain values and the at least one gain value,
    wherein the plurality of block areas include a first block area and a second block area having a shorter distance from a center of the calibration image than the first block area and having a size greater than that of the first block area.

12. The method according to claim 11, wherein a larger number of bits are assigned to each gain value included in the first block area than a number of bits assigned to each gain value included in the second block area.

13. The method according to claim 11, wherein the calculating the reference gain values comprises:
selecting pixel values, corresponding to the vertices of each of the plurality of block areas, from among a plurality of pixel values included in the calibration image acquired through the image sensing device;
calculating an average pixel value of pixel values, having a color channel identical to a color channel of one of the selected pixel values, among pixel values included in a region of interest including each of the selected pixel values; and
calculating one reference gain value among the reference gain values using a pixel value of each of the selected pixel values and the average pixel value.

14. The method according to claim 13, wherein the identical color channel is one of a first green channel, a second green channel, a red channel, and a blue channel.

15. The method according to claim 13, wherein:
the identical color channel is one of a first green channel and a second green channel, and
the average pixel value includes an average of pixel values of pixel values with the first green channel and pixel values of pixel values with the second green channel, among the pixel values included in the region of interest.

16. The method according to claim 11, wherein the calculating the at least one gain value gain comprises calculating a gain value corresponding to a point selected in one of the plurality of block areas based on distances from the selected point to vertices of the one block area and the reference gain values corresponding to the vertices of the one block area.

17. The method according to claim 16, wherein:
the vertices of the one block area include a first vertex, a second vertex, a third vertex, and a fourth vertex of the one block area, and
the calculating the gain value corresponding to the selected point comprises:
calculating the gain value corresponding to the selected point based on a distance from the selected point to the first vertex, a distance from the selected point to the second vertex, a distance from the selected point to the third vertex, a distance from the selected point to the fourth vertex, the reference gain value corresponding to the first vertex, the reference gain value corresponding to the second vertex, the reference gain value corresponding to the third vertex, and the reference gain value corresponding to the fourth vertex.

18. The method according to claim 11, wherein each of the plurality of block areas is a rectangular or square area.

\* \* \* \* \*